(12) United States Patent
Hirai

(10) Patent No.: US 10,657,365 B2
(45) Date of Patent: May 19, 2020

(54) SPECIFIC PERSON DETECTION SYSTEM AND SPECIFIC PERSON DETECTION METHOD

(71) Applicant: Hitachi Kokusai Electric Inc., Tokyo (JP)

(72) Inventor: Seiichi Hirai, Tokyo (JP)

(73) Assignee: HITACHI KOKUSAI ELECTRIC INC., Tokyo (JP)

( * ) Notice: Subject to any disclaimer, the term of this patent is extended or adjusted under 35 U.S.C. 154(b) by 204 days.

(21) Appl. No.: 15/759,531

(22) PCT Filed: Sep. 14, 2015

(86) PCT No.: PCT/JP2015/075978
§ 371 (c)(1),
(2) Date: Mar. 13, 2018

(87) PCT Pub. No.: WO2017/046838
PCT Pub. Date: Mar. 23, 2017

(65) Prior Publication Data
US 2019/0147236 A1    May 16, 2019

(51) Int. Cl.
*G06K 9/00* (2006.01)
*H04N 7/18* (2006.01)

(52) U.S. Cl.
CPC ..... *G06K 9/00369* (2013.01); *G06K 9/00771* (2013.01); *H04N 7/18* (2013.01)

(58) Field of Classification Search
CPC .......... G06K 9/00771; G06K 9/00221–00315; G06K 9/00369; G06K 9/6262; G06K 9/6293; H04N 7/18
(Continued)

(56) References Cited

U.S. PATENT DOCUMENTS

2004/0240711 A1* 12/2004 Hamza ............... G06K 9/00201
382/118
2011/0019003 A1   1/2011 Asa et al.
(Continued)

FOREIGN PATENT DOCUMENTS

JP    2006-146413 A    6/2006
JP    2011-215896 A    10/2011
(Continued)

OTHER PUBLICATIONS

Xiao-Ma, Xu, and Pei Ming-Tao. "Multiview face retrieval in surveillance video by active training sample collection." 2014 Tenth International Conference on Computational Intelligence and Security. IEEE, 2014. (Year: 2014).*
Bauml, Martin, et al. "Multi-pose face recognition for person retrieval in camera networks." 2010 7th IEEE International Conference on Advanced Video and Signal Based Surveillance. IEEE, 2010. (Year: 2010).*

(Continued)

*Primary Examiner* — Geoffrey E Summers
(74) *Attorney, Agent, or Firm* — Mattingly & Malur, PC

(57) ABSTRACT

This specific person detection system: identifies, from among the persons recorded in a specific person recording unit, a person who most closely matches a feature value extracted from image data; calculates the degree to which feature values of a plurality of persons extracted from other image data match the identified person; and outputs, as an identification result, information about a person who has a feature value closely matching the identified person, and who is associated with angle information that most closely matches angle information associated with the identified person.

7 Claims, 24 Drawing Sheets

(58) Field of Classification Search
USPC ......................................................... 382/118
See application file for complete search history.

(56) References Cited

U.S. PATENT DOCUMENTS

| | | | |
|---|---|---|---|
| 2011/0222743 A1* | 9/2011 | Tanaka | G06K 9/00288 |
| | | | 382/118 |
| 2013/0329059 A1* | 12/2013 | Uchikoshi | G06F 3/005 |
| | | | 348/207.1 |
| 2013/0329970 A1* | 12/2013 | Irie | G06K 9/00288 |
| | | | 382/118 |
| 2014/0067679 A1* | 3/2014 | O'Reilly | G06Q 20/40145 |
| | | | 705/44 |
| 2014/0184812 A1 | 7/2014 | Tsuji | |
| 2015/0112970 A1 | 4/2015 | Hirai et al. | |
| 2015/0278584 A1* | 10/2015 | Nakano | G06K 9/4661 |
| | | | 382/118 |
| 2016/0012280 A1 | 1/2016 | Ito et al. | |

FOREIGN PATENT DOCUMENTS

| | | |
|---|---|---|
| JP | 2014-048722 A | 3/2014 |
| JP | 2014-106816 A | 6/2014 |
| JP | 2014-128003 A | 7/2014 |
| WO | 2014/132841 A1 | 9/2014 |

OTHER PUBLICATIONS

Nair, Binu Muraleedharan, et al. "Multi-pose face recognition and tracking system." Procedia Computer Science 6 (2011): 381-386. (Year: 2011).*

Tsai, Grace Shin-Yee, and Angela Chih-Wei. "Two-view face recognition using bayesian fusion." 2009 IEEE International Conference on Systems, Man and Cybernetics. IEEE, 2009. (Year: 2009).*

Zervos, Michail. Multi-camera face detection and recognition applied to people tracking. No. STUDENT. 2013. (Year: 2013).*

International Search Report of PCT/JP2015/075978 dated Oct. 20, 2015.

Extended European Search Report received in corresponding European Application No. 15904027.8 dated Apr. 4, 2019.

* cited by examiner

FIG.3
320
| | 310 | 311 | 312 | 313 | 314 |
|---|---|---|---|---|---|
| 300 | 1 | A | 0.9 | DOWNWARD 10°<br>RIGHTWARD/LEFTWARD 0° | 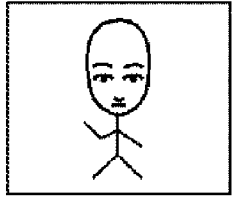 |
| 301 | 2 | B | 4.9 | UPWARD/DOWNWARD 0°<br>RIGHTWARD/LEFTWARD 0° | 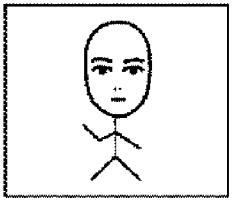 |
| 302 | 3 | C | 3.6 | UPWARD/DOWNWARD 0°<br>RIGHTWARD/LEFTWARD 0° | 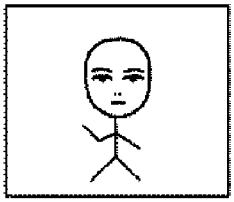 |
| 303 | 4 | D | 6.2 | UPWARD/DOWNWARD 0°<br>LEFTWARD 20° | 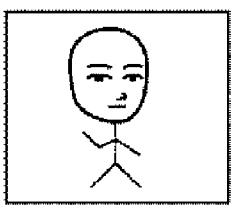 |
| 304 | 5 | E | 1.4 | UPWARD/DOWNWARD 0°<br>RIGHTWARD 10° | 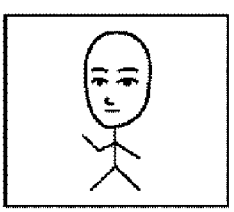 |

| | 510 | 511 | 512 | 513 | 514 |
|---|---|---|---|---|---|
| 500 | 1 | E | 0.90 | UPWARD/DOWNWARD 0°<br>RIGHTWARD/LEFTWARD 0° | (90, 100) (260, 500) |
| 501 | 2 | | | | |
| 502 | 3 | | | | |
| 503 | 4 | | | | |
| 504 | 5 | | | | |
| 505 | 6 | | | | |
| 506 | 7 | | | | |

520

|  | 510 | 511 | 512 | 513 | 514 |
|---|---|---|---|---|---|
| 500 | 1 | E | 0.90 | UPWARD/DOWNWARD 0°<br>RIGHTWARD/LEFTWARD 0° | (90, 100) (260, 500) |
| 501 | 2 | E | 0.20 | UPWARD 0°<br>RIGHTWARD 8° | (100, 120) (250, 470) |
| 502 | 3 | | | | |
| 503 | 4 | | | | |
| 504 | 5 | | | | |
| 505 | 6 | | | | |
| 506 | 7 | | | | |

520

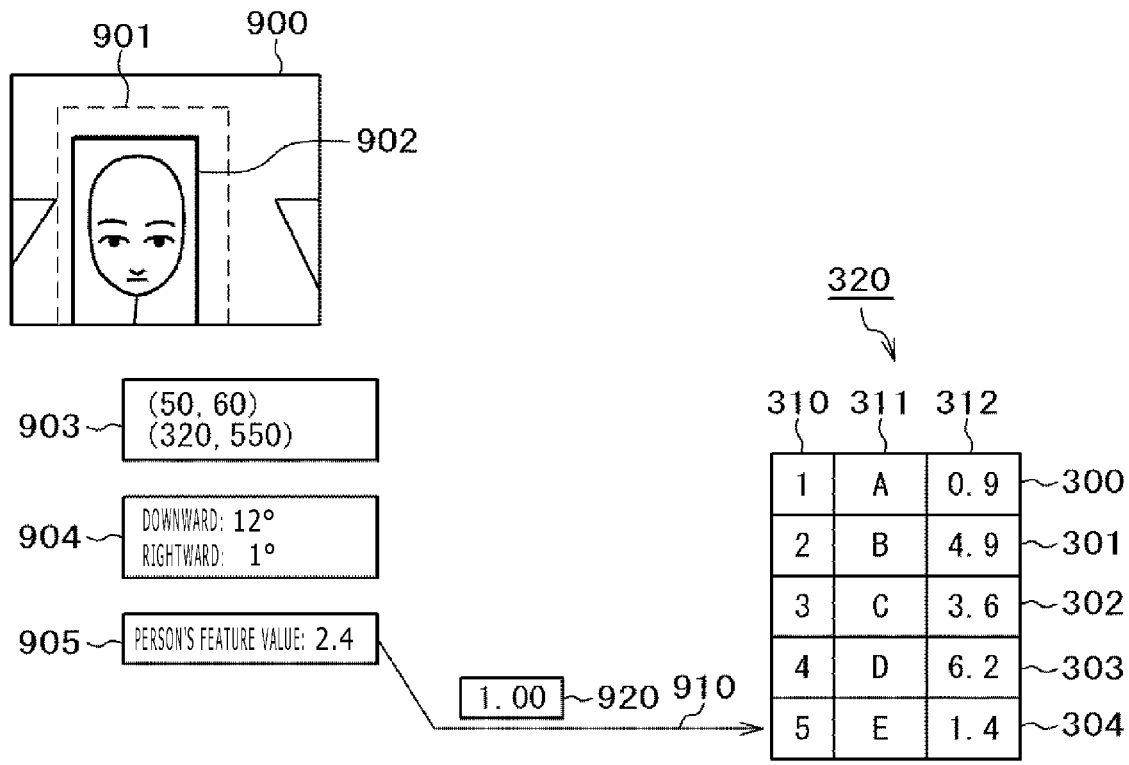

| | 510 | 511 | 512 | 513 | 514 |
|---|---|---|---|---|---|
| 500 | 1 | E | 0.90 | UPWARD/DOWNWARD 0°<br>RIGHTWARD/LEFTWARD 0° | (90, 100) (260, 500) |
| 501 | 2 | E | 0.20 | UPWARD/DOWNWARD 0°<br>RIGHTWARD 8° | (100, 120) (250, 470) |
| 502 | 3 | E | 2.50 | UPWARD/DOWNWARD 0°<br>LEFTWARD 13° | (50, 60) (320, 550) |
| 503 | 4 | | | | |
| 504 | 5 | | | | |
| 505 | 6 | | | | |
| 506 | 7 | | | | |

520

F I G . 16
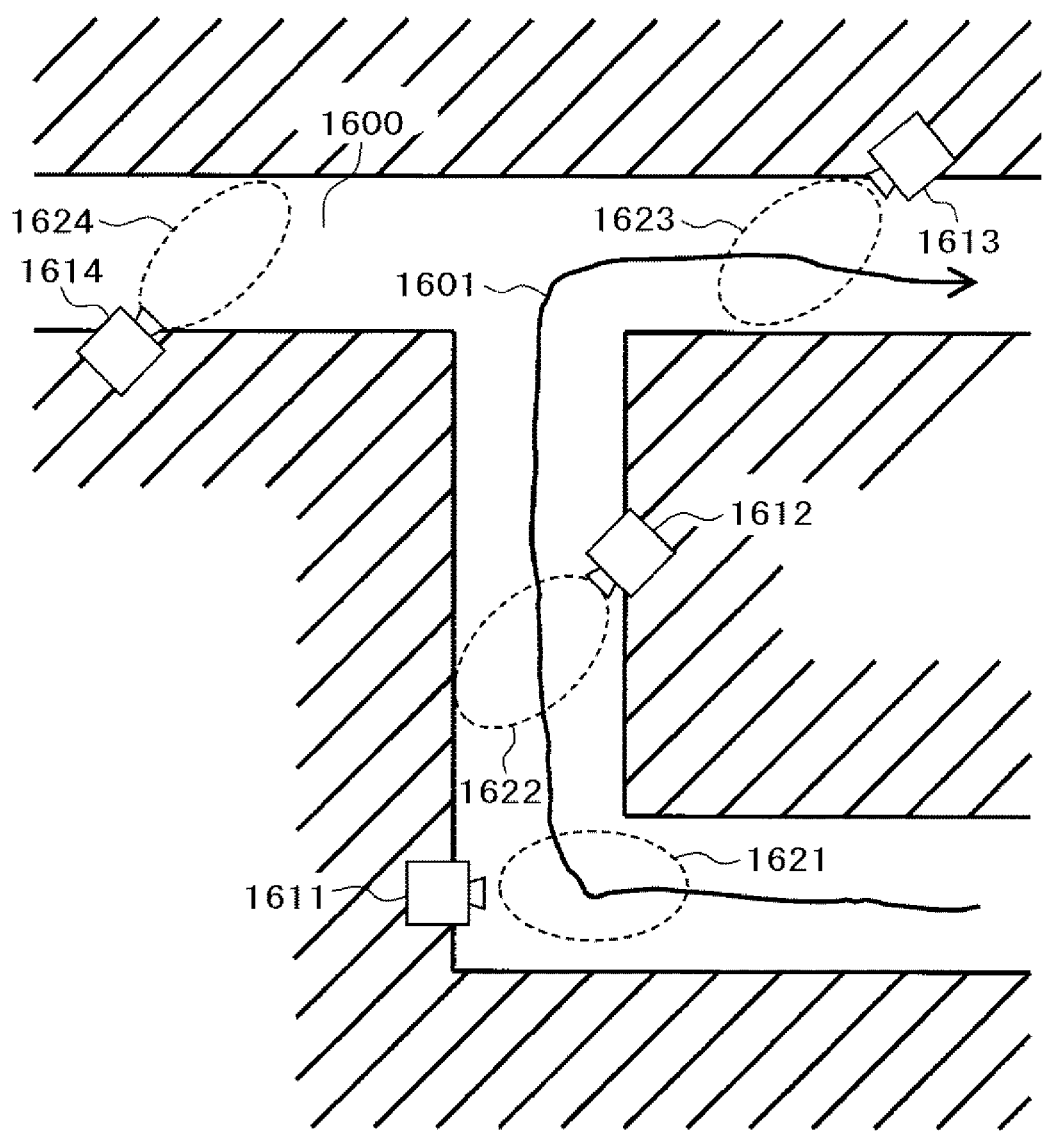

FIG.17

|  | IMAGE PICKUP AREA 1621 | IMAGE PICKUP AREA 1622 | IMAGE PICKUP AREA 1623 | IMAGE PICKUP AREA 1624 |
|---|---|---|---|---|
| IMAGE PICKUP AREA 1621 |  | 10 | 17 | 18 |
| IMAGE PICKUP AREA 1622 | 10 |  | 7 | 8 |
| IMAGE PICKUP AREA 1623 | 17 | 7 |  | 5 |
| IMAGE PICKUP AREA 1624 | 18 | 8 | 5 |  |

F I G . 1 8 A
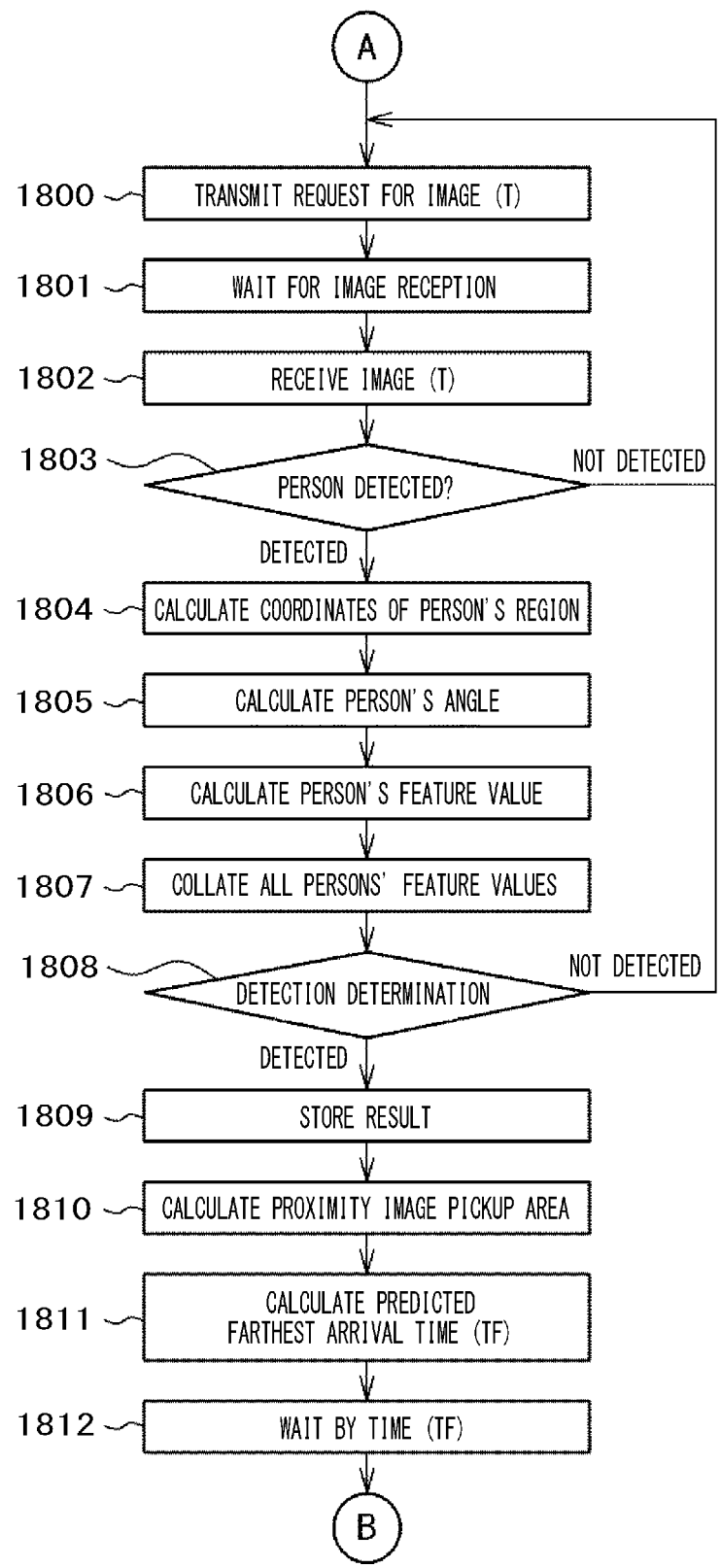

| | 510 | 511 | 512 | 513 |
|---|---|---|---|---|
| 500 | 1 | E | 0.90 | UPWARD/DOWNWARD 0°<br>RIGHTWARD/LEFTWARD 0° |
| 501 | 2 | | | |
| 502 | 3 | | | |
| 503 | 4 | | | |
| 504 | 5 | | | |
| 505 | 6 | | | |
| 506 | 7 | | | |

520

| | 510 | 511 | 512 | 513 |
|---|---|---|---|---|
| 500 | 1 | E | 0.90 | UPWARD/DOWNWARD 0°<br>RIGHTWARD/LEFTWARD 0° |
| 501 | 2 | E | 0.20 | UPWARD/DOWNWARD 0°<br>RIGHTWARD 8° |
| 502 | 3 | E | 2.50 | UPWARD/DOWNWARD 0°<br>LEFTWARD 13° |
| 503 | 4 | | | |
| 504 | 5 | | | |
| 505 | 6 | | | |
| 506 | 7 | | | |

520

SPECIFIC PERSON DETECTION SYSTEM AND SPECIFIC PERSON DETECTION METHOD

TECHNICAL FIELD

The present invention relates to a specific person detection system, and is applicable to, e.g., to a specific person detection system to detect a specific person using coincidence obtained from an image feature value.

BACKGROUND ART

Systems and techniques for automatically detecting occurrence of specific event in a video image in a real-time manner, using an image recognition technique, are developed. A specific person detection system is known as typical one of such systems. The specific person detection system is a system having a function of automatically detecting a person previously image-registered as a detection object (hereinafter, specific person), when appears in a monitored video image, and notifying a system operator of the detection of the person. The detection is performed by collation of image feature value between a specific person's image and images of a person appeared in the monitored video image (appeared person), to calculate coincidence between both persons' images, and when the coincidence is a value within a certain range, determining that they are the same person, i.e., the specific person.

CITATION LIST

Patent Literature

PTL 1: Japanese Patent Application Laid-Open No. 2014-106816

SUMMARY OF INVENTION

Technical Problem

In the specific person detection system, the appeared person is not aware of the presence of the camera in many cases in accordance with the characteristic of the monitoring camera. As the appeared person does not always face the camera, the image feature value is not stabled due to direction fluctuation of the person in some cases. This causes degradation of detection accuracy in the specific person detection system. More particularly, this appears as overlooking and erroneous detection.

To address the direction fluctuation, preparation and registration of images from various angles in advance regarding a previously-registered person's image to improve the accuracy is proposed (e.g., Japanese Patent Application Laid-Open No. 2014-106816). However, in some cases, it is difficult to previously prepare images from various angles.

The object of the present invention is to provide a specific person detection system in which the degradation of detection accuracy is reduced.

Solution to Problem

In the present disclosure, the outline of a typical aspect will be described as follows.

That is, in a specific person detection system, a person recorded in a specific person unit most similar to a feature value extracted from image data is obtained. Similarity between a feature value extracted from other image data and the person is calculated. Among persons with high similarity, a person having angle information most similar to the person is outputted as a collation result.

Advantageous Effects of Invention

According to aspects the present invention, it is possible to obtain higher detection accuracy in the specific person detection system.

BRIEF DESCRIPTION OF DRAWINGS

FIG. 3 is a diagram showing an aspect of record data in a specific person recording unit in FIG. 2.

FIG. 9A is a diagram explaining the content of processing at steps 422 to 432.

FIG. 9B is a diagram explaining the content of processing at steps 422 to 432.

FIG. 16 is a diagram showing positional relationship in installation of image pickup devices in a building in overhead view.

FIG. 17 is a diagram showing an aspect of distance data between image-pickup areas in a control instruction unit 209.

FIG. 18A is a diagram showing the flow of processing in the detection device in FIG. 15.

DESCRIPTION OF EMBODIMENTS

Figure 1:
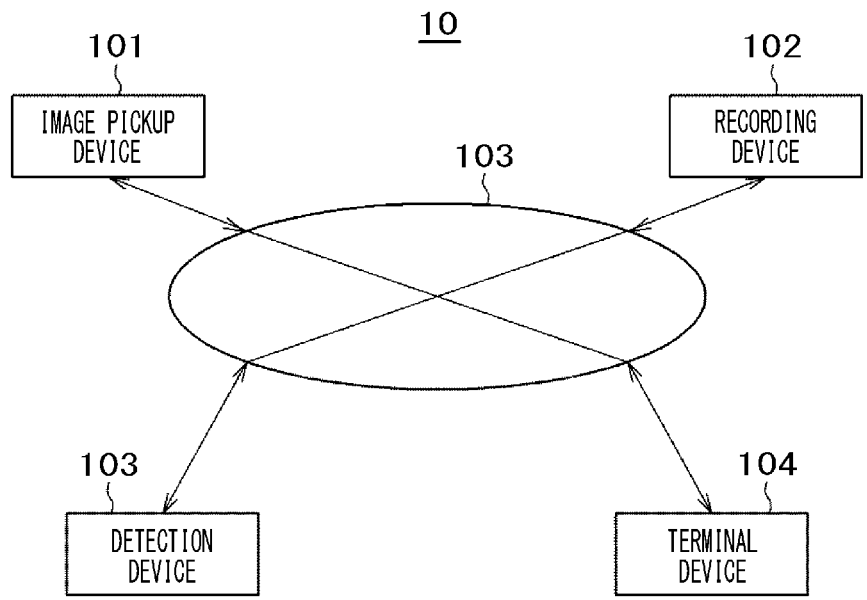
FIG. 1 is a diagram showing a device configuration of a specific person detection system according to an example 1.

In a specific person detection system according to embodiments, a person recorded in a specific person unit most similar to a feature value extracted from image data is obtained. Similarity between a feature value extracted from other image data and the person is calculated. Among persons with high similarity, a person having angle information most similar to the person is outputted as a collation result.

According to the specific person detection system according to the embodiments, it is possible to obtain higher detection accuracy.

Hereinbelow, the embodiments will be described using the drawings. Note that in the following description, the same constituent elements have the same reference numeral. Repetitive explanations may be omitted.

Example 1

A device configuration of a specific person detection system according to an example 1 will be described using FIG. 1. In a specific person detection system 10, an image pickup device 101, a recording device 102, a detection device 103, and a terminal device 104 are connected to a network 100 in a mutually communicable status.

The network 100 is a communication line such as a specialized line, an Intra-net, the Internet, or a wireless LAN, for mutually connecting the respective devices for data communication.

The image pickup device 101 is a device such as a monitoring camera having a zoom lens for perspective control and focus control, an image pickup device such as a CCD or a CMOS, an A/D converter for digital conversion of an analog signal, a temporary memory such as a RAM, a data transmission bus, a timing circuit, an external input/output interface, a power source circuit, a camera platform for panning, tilting and the like, an illumination device such as a visible light device or a near-infrared LED, and the like.

The image pickup device 101 converts light passed through the lens into an electric signal with the image pickup device. The image pickup device converts the converted electric signal into a digital value with the A/D converter. Then the image pickup device stores the converted digital value into the temporary memory as image data. The stored image data is outputted from the external input/output interface to the network 100 in accordance with an external video image request inputted into the external input/output interface, an instruction from the timing circuit, or the like. Further, the direction of image pickup, the perspective and focus of the lens, the quantity of illumination and the like are changed in accordance with an external control command similarly inputted into the external input/output interface.

The recording device 102 is a device such as a network digital recorder having a temporary memory such as a RAM, a recording medium such as an HDD, a data transmission bus, a timing circuit, an external input/output interface, a power source circuit, and the like.

The recording device 102 records image data from the image pickup device 101, inputted from the network 100 to the external input/output interface, with its image time, into the recording medium such as an HDD. The recorded image data is outputted from the external input/output interface to the network 100 in accordance with an external video image request inputted in the external input/output interface, an instruction from the timing circuit or the like. The video image request includes image time. The recording device 102 outputs image data at image time included in the video image request.

In the present example, the recording device 102 always records the video image from the image pickup device 101.

The detection device 103 is a device such as a computer having an arithmetic circuit such as a CPU, a temporary memory such as a RAM, a recording medium such as an HDD, a data transmission bus, an external input/output interface, a power source circuit, and the like.

The detection device 103 stores image data from the image pickup device 101, inputted from the network 100 in the external input/output interface, into the temporary memory. The detection device performs various arithmetic operations related to specific person detection, using the arithmetic circuit, on the stored image data. The recording medium holds a set of software application programs, an OS (Operation System), a set of specific persons' images (person feature values), and the like. The result of specific person detection is outputted from the external input/output interface to the network 100.

The terminal device 104 is a device such as a computer having an arithmetic circuit such as a CPU, a temporary memory such as a RAM, a recording medium such as an HDD, a data transmission bus, an external input/output interface, a power source circuit, a screen such as a liquid crystal display, and user input devices such as a keyboard and a mouse. Further, the terminal device 104 may be additionally provided with e.g. a buzzer or voice announcement device, an LED and the like.

The terminal device 104 stores image data from the image pickup device 101, inputted from the network 100 in the external input/output interface, and a specific person detection result from the detection device 103, into the temporary memory. The terminal device converts the stored image data and the specific person detection result, using the arithmetic circuit, in a format appropriate for display, and displays them on the screen. The recording medium holds a set of software application programs, an OS, and the like. Further, user operation with respect to the terminal device 104 is performed with respect to the user input device.

Figure 2:
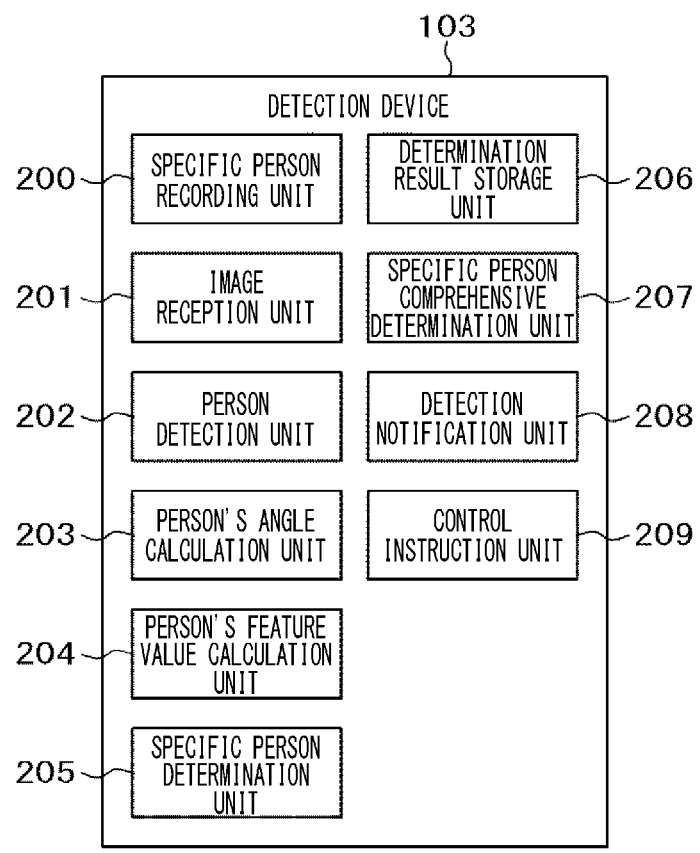
FIG. 2 is a diagram showing a functional configuration of a detection device in FIG. 1.

As shown in FIG. 2, the detection device 103 is configured with respective processors, a specific person recording unit 200, an image reception unit 201, a person detection unit 202, a person's angle calculation unit 203, a person's feature value calculation unit 204, a specific person determination unit 205, a determination result storing unit 206, a specific person comprehensive determination unit 207, a detection notification unit 208, and a control instruction unit 209.

The specific person recording unit 200 is a processing unit which, upon image registration of a specific person, records the person's image, the person's feature value, the person's ID (name, identification information uniquely given to the person) and the like in the recording medium. For example, it is a database. It is configured such that the data is previously given, in any way. The aspect of the record data in the specific person recording unit will be described later.

The image reception unit 201 is a processing unit which performs image input/output from the outside of the device. In the present example, it receives input image data from the image pickup device 101 and the recording device 102.

The person detection unit 202 performs person detection using an image recognition technique with respect to the input image data in the image reception unit 201, determines the existence of person. When a person exists in the image, the person detection unit 202 outputs the coordinates of the region.

The person's angle calculation unit 203 is a processing unit which performs angle calculation using the image recognition technique with respect to the person's region in the image detected with the person detection unit 202.

The person's feature value calculation unit 204 is a processing unit which performs feature value calculation using the image recognition technique with respect to the person's region in the image detected with the person detection unit 202.

The specific person determination unit 205 is a processing unit which performs primary determination as to whether or not the person detected with the person detection unit 202 corresponds to a specific person, using the feature value obtained with the person's feature value calculation unit 204.

The determination result storing unit 206 is a processing unit which stores the result of determination with the specific person determination unit 205 and the like into the temporary memory and saves them. The aspect of the stored data in the determination result storing unit will be described later.

The specific person comprehensive determination unit 207 is a processing unit which performs secondary determination with respect to the determination result, determined with the specific person determination unit 205 and stored in the determination result storing unit 206, from plural determination results.

The detection notification unit 208 is a processing unit which, upon detection of a specific person with the specific person comprehensive determination unit 207, performs input/output of the result notification. It transmits specific person detection result data to the terminal device 104.

The control instruction unit 209 is a processing unit which issues an instruction to the respective processing units.

As shown in FIG. 3, in record data 320 in the specific person recording unit 201, e.g. information on one person is recorded as one record. Information on five specific persons, i.e. five records are recorded as records 300 to 304.

The records 300 to 304 are respectively configured with a record number cell 310, a person ID cell 311, a feature value cell 312, an angle cell 313, and a person image cell 314.

The record number cell 310 is a region to store a record number. The record number is a number used for record management. For example, it is a continuous integer value uniquely assigned by record.

The person ID cell 311 is a region to store a person ID of a specific person. In the present example, a character string as a person name is stored. As long as the ID is identification information uniquely given to the person, an integer value or the like may be used.

The feature value cell 312 is a region to store a person's feature value of a specific person. In the present example, for the sake of simplicity of explanation, a small number value as a one dimensional value is stored. However, a multidimensional value may be used.

The angle cell 313 is a region to store an image pickup angle of a specific person.

The person image cell 314 is a region to store a specific person's image. In the present example, a person image itself is stored. However, an address of a region separately storing the image may be stored in the form of hexadecimal number.

In the present example, a set of a feature value, an angle, and an image is stored per one person. It may be configured such that plural sets of feature amounts, angles, and images are stored per one person.

Figure 4A:
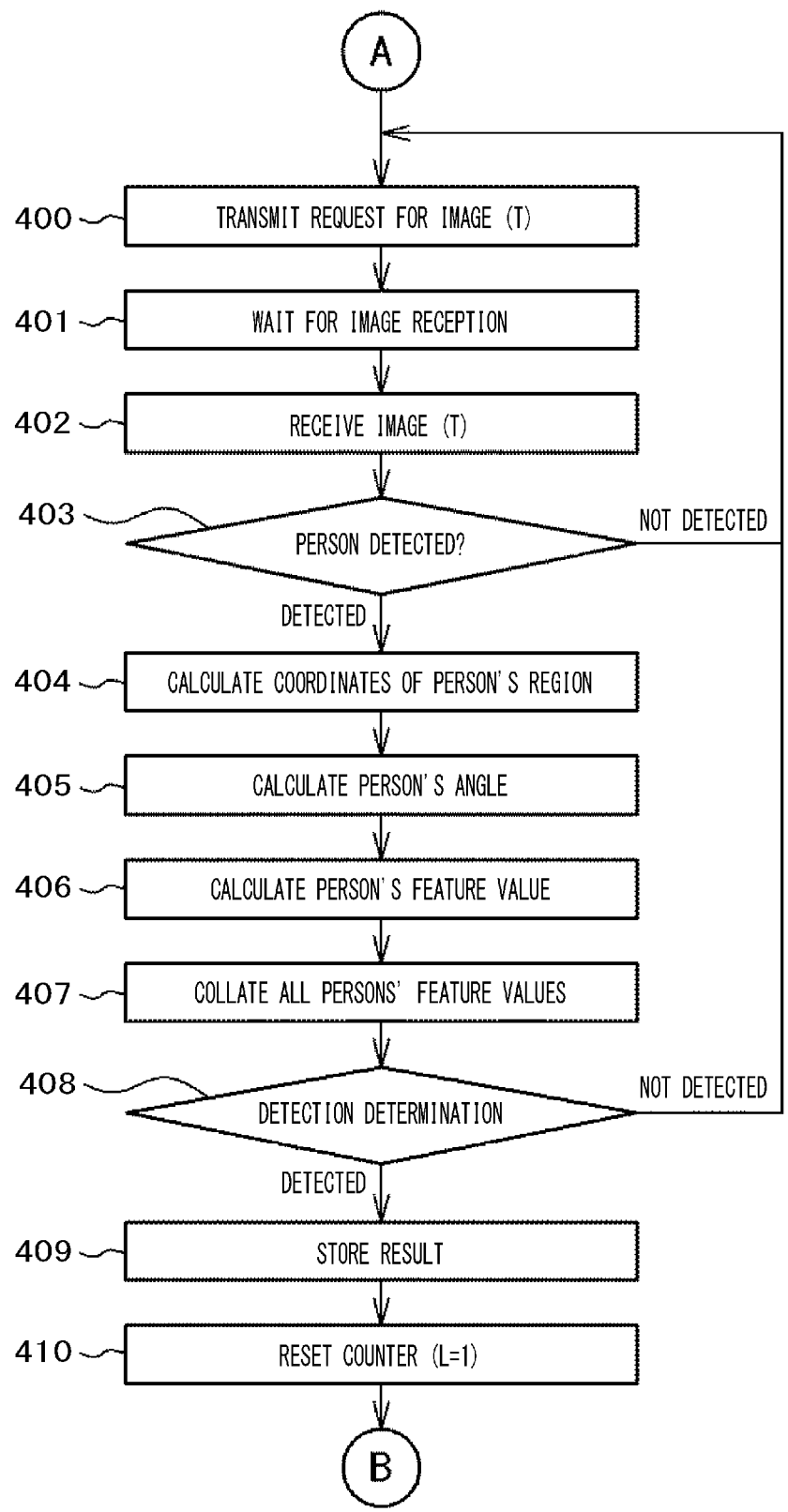
FIG. 4A is a diagram showing the flow of processing in the detection device in FIG. 1.
Figure 4B:
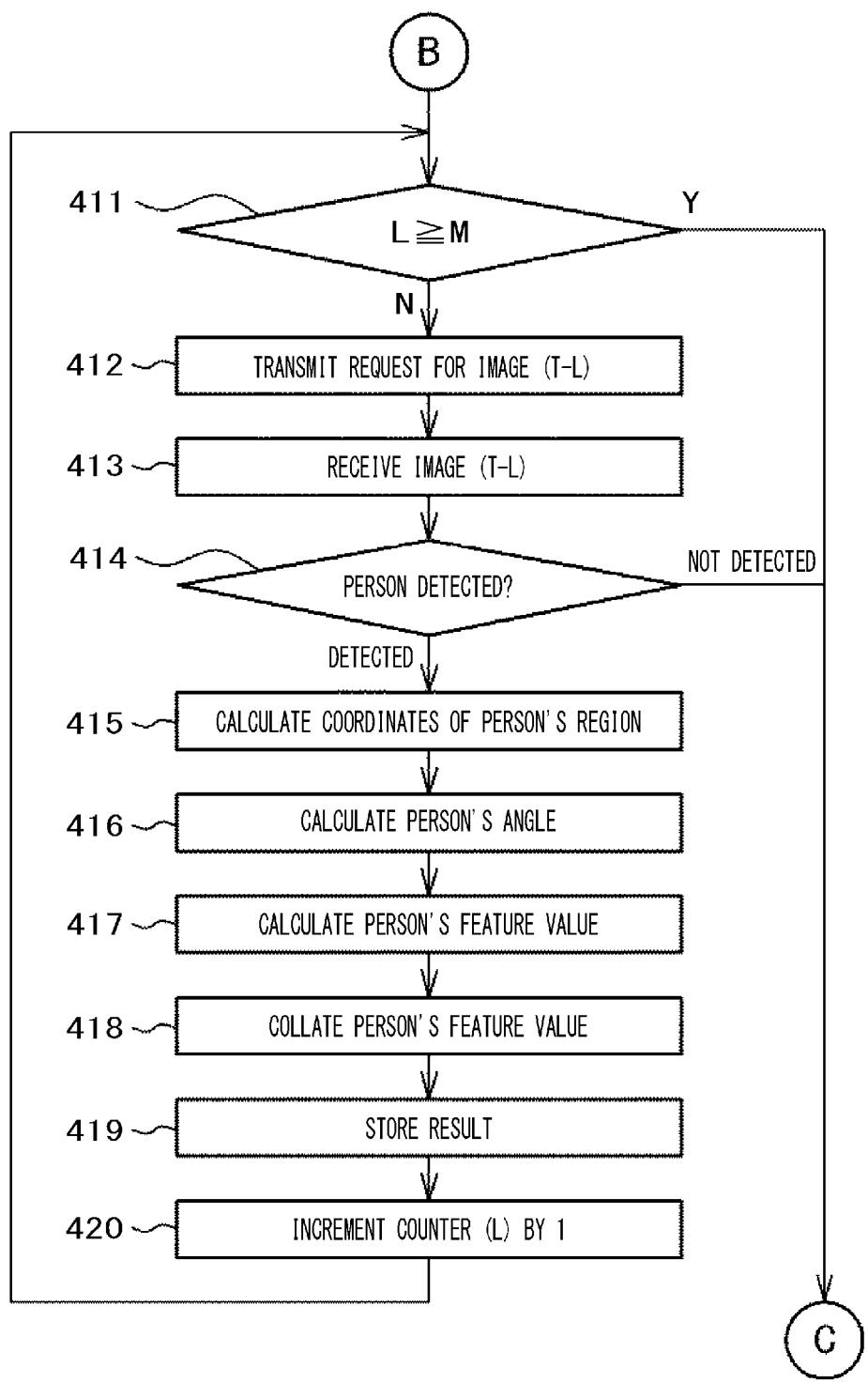
FIG. 4B is a diagram showing the flow of processing in the detection device in FIG. 1.
Figure 4C:
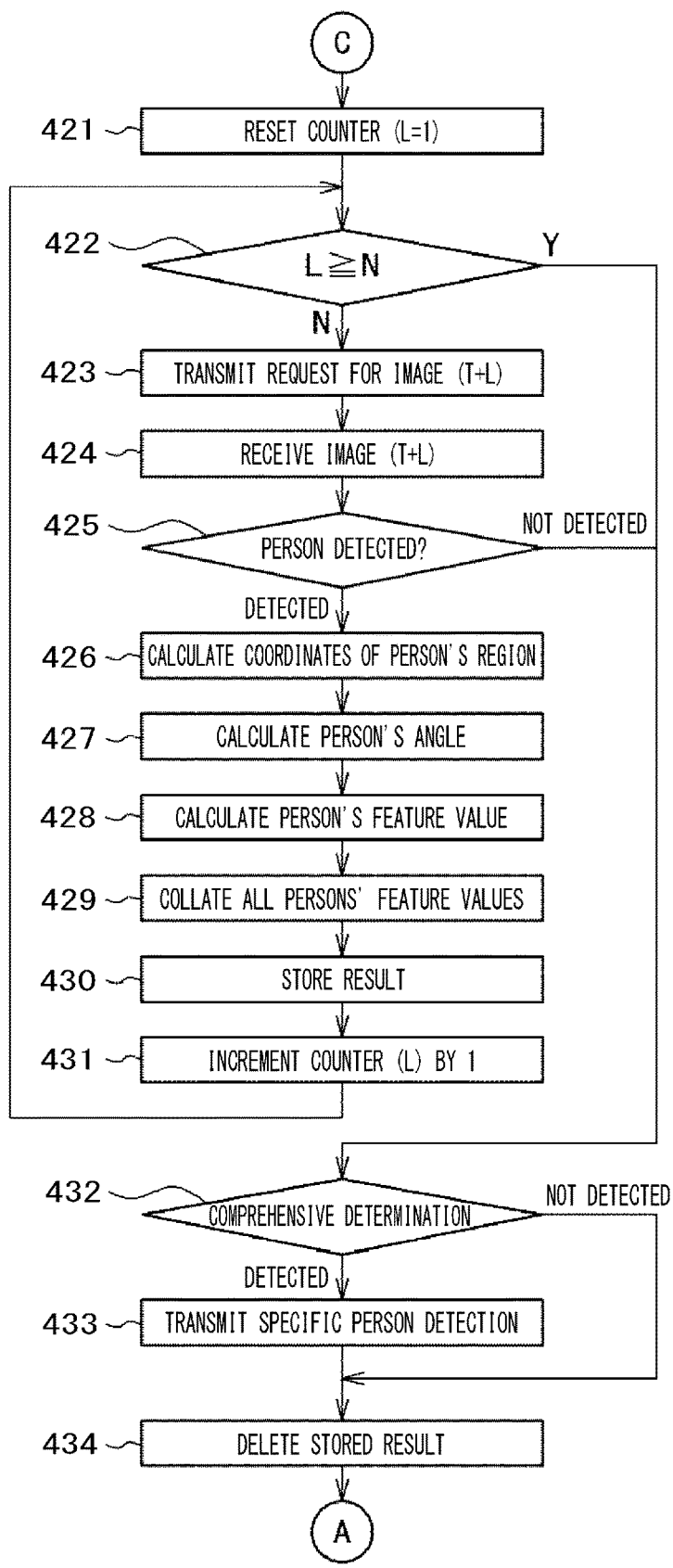
FIG. 4C is a diagram showing the flow of processing in the detection device in FIG. 1.

The flow of processing in the detection device 103 will be described using FIGS. 4A to 4C.

Step 400: the control instruction unit 209 calculates time (T) of an image to be obtained next. When specific person detection is performed by several frames, time several frames ahead of current time is calculated as image time (T). Then, the image reception unit 201 requests the image pickup device 101 to output an image (T).

Step 401: the image reception unit 201 performs image reception waiting. When image incoming from the image pickup device 101 is detected, the process proceeds to step 402.

Step 402: the image reception unit 201 receives an image from the image pickup device 101. The image at the reception time (T) is the image (T).

Step 403: the person detection unit 202 detects person from the received image data. The person detection is performed by e.g. a method of moving body detection with a difference from a background image and further performing person determination with area, shape, moving speed or the like of its moving body region, a method of searching existence/absence of region having an image feature pattern of a person, previously learned and prepared, using intra-image searching, or the like. In the present example, the person detection may be performed by any method. Further, the person detection may be performed on the entire person or may be performed on a partial region such as a face which is a typical portion in person specification. As a result of the above detection, when a person is detected, the process proceeds to step 404. When a person is not detected, the process returns to step 400.

Step 404: the person detection unit 202 calculates coordinates person's region coordinates of the person detected at step 403.

Step 405: the person's angle calculation unit 203 calculates an image pickup angle with respect to the person's region image calculated at step 404. The calculation of person's image pickup angle is performed by e.g. a method of detecting respective organs such as eyes, a nose, a mouth and the like from the region image, and obtaining the angle from the arrangement relationship among them, a method of previously preparing an image from an already known angle and obtaining the angle from similarity with the image, or the like. In the invention according to the present example, any method may be used.

Step 406: the person's feature value extraction unit 204 calculates a person's feature value with respect to the person's region image calculated at step 404. As the calculated person's feature value, e.g. the shape or direction of the person's outline, colors of hair and skin, gait, or the shape or direction of the face outline, sizes and shapes of primary constituent elements such as the eyes, the nose and the mouth, arrangement relationship among them, and the like, are given. In the present example, any type(s) and/or number of feature value(s) may be used.

Step 407: the specific person determination unit 205 performs collation on all the person's feature values. More particularly, the person's feature value calculated at step 406 is collated (coincidence calculation) sequentially with respect to all the persons' feature values of the respective specific persons previously recorded in the specific person recording unit 200. A feature value with the highest coincidence is found. A person having this feature value is determined as a most similar person. Note that the coincidence is a numerical value indicating proximity between images (image feature values). Regarding the calculation method, e.g. papers such as "Visualization Models for Large Image Sets" (HIROIKE, Atsushi et. al, Journal of Japan Photo Society 2003, vol. 66 no. 1, P 93-P 101) may be referred to. In the coincidence in the present example, as the value is smaller, the coincidence is higher. In the present example, as methods for the determination of the collation order and the calculation of the coincidence, any method may be used.

Step 408: the specific person determination unit 205 performs specific person detection determination (primary detection). As the detection determination, regarding the most similar person obtained at step 407, in the relationship between the coincidence and a certain constant value (first threshold value), when the coincidence is equal to or lower than the threshold value, it is determined that the person has been detected as the specific person. When detection is determined, the process proceeds to step 409, otherwise, the process returns to step 400.

Step 409: the determination result storing unit 206 stores the result obtained with respect to the image (T) and saves it. Note that the data as the object of storage includes the coincidence and the person ID of the most similar person obtained at step 408, the angle obtained at step 405, and the coordinates of the person's region calculated at step 404. The aspect of the stored data will be described later.

Step 410: the control instruction unit 209 resets a counter (L) to 1.

Step 411: the control instruction unit 209 compares the counter (L) with a previously-set limit value (M). When the value L is less than the value M, the process proceeds to step 412. When the value L is equal to or greater than the value M, the process proceeds to step 421. Note that the value M is e.g. 4.

Step 412: the image reception unit 201 requests the recording device 102 to output an image (T-L) L-frame before of the image (T).

Step 413: the image reception unit 201 receives the image (T-L) from the recording device 102.

Step 414: the person detection unit 202 performs detection of a person the same as the person detected at step 403 with respect to the received image data. At this time, when the counter (L) is 1, detection is performed only on a neighboring region of the region image of the person calculated at step 404, otherwise, calculated at previous step 414, as the object of detection. The method for the person detection is as in the case of step 403. The identification between the person detected at step 403 and the person detected at the present step is made by, e.g. a method of obtaining an overlap area between the person's region obtained at step 403 and the person's region obtained at the present step, and when the value is equal to or higher than a constant value, they are the same, or the like. The above constant value is previously given in consideration of an apparent moving amount of the person in the image. As a result of the above operation, when the same person is detected, the process proceeds to step 415. When the same person is not detected, the process proceeds to step 421.

Step 415: the person detection unit 202 calculates the person's region coordinates of the person detected at step 414.

Step 416: the person's angle calculation unit 203 calculates an image pickup angle with respect to the region image of the person calculated at step 415. The method for angle calculation is the same as in the case of step 405.

Step 417: the person's feature value extraction unit 204 calculates the person's feature value with respect to the region image of the person calculated at step 415. The method for calculation of person's feature value is the same as in the case of step 406.

Step 418: the specific person determination unit 205 performs collation of the person's feature value. More particularly, the feature value of the most similar person obtained at step 407 is read from the persons' feature values of the respective specific persons, previously recorded in the specific person recording unit 200. The read feature value is collated with the person's feature value calculated at step 417, and coincidence is calculated. The method for coincidence calculation is the same as in the case of step 407.

Step 419: the determination result storing unit 206 stores the result obtained with respect to the image (T-L) and saves it. Note that the data as the object of storage includes the coincidence obtained at step 418, the angle obtained at step 416, and the coordinates of the person's region calculated at step 415.

Step 420: the control instruction unit 209 increments the counter L by 1, and returns the control to step 411. In the present example, the increment amount is 1, i.e., continuous frames are used. When an image pickup frame rate of the image pickup device 101 is high with respect to the moving speed of a person in the image, the increment amount may be 2 or more, to use discrete frames. The frames may be similarly used herein below.

Step 421: the control instruction unit 209 resets the counter (L) to 1.

Step 422: the control instruction unit 209 compares the counter (L) with a previously-set limit value (N). When the value L is less than the value N, the process proceeds to step 423. When the value L is equal to or greater than N, the process proceeds to step 432. Note that N is e.g. 4.

Step 423: the image reception unit 201 requests the recording device 102 to output an image (T+L) L-frame after the image (T).

Step 424: the image reception unit 201 receives the image (T+L) from the recording device 102.

Step 425: the person detection unit 202 performs person detection with respect to the received image data as to the same person as the person detected at step 403. At this time, when the counter (L) is 1, detection is performed only on a neighboring region of the region image of the person calculated at step 404, otherwise, calculated at previous step 425, as the object of detection. The method for person detection is the same as in the case of step 403. The identification between the person detected at step 403 and the person detected at the present step is the same as in the case of step 414. As a result of the above operation, when the same person is detected, the process proceeds to step 426. When the same person is not detected, the process proceeds to step 432.

Step 426: the person detection unit 202 calculates the person's region coordinates of the person detected at step 425.

Step 427: the person's angle calculation unit 203 calculates an image pickup angle with respect to the region image of the person calculated at step 426. The method for angle calculation is the same as in the case of step 405.

Step 428: the person's feature value extraction unit 204 calculates a person's feature value with respect to the region image of the person calculated at step 426. The method for person's feature value calculation is the same as in the case of step 406.

Step 429: the specific person determination unit 205 performs collation on the person's feature value. More particularly, the feature value of the most similar person obtained at step 407 is read from the persons' feature values of the respective specific persons previously recorded in the specific person recording unit 200. The read feature value is collated with the person's feature value calculated at step 428, and the coincidence is calculated. The method for coincidence calculation is the same as in the case of step 407.

Step 430: the determination result storing unit 206 stores the result obtained with respect to the image (T+L) and saves it. Note that the data as the object of storage includes the coincidence obtained at step 429, the angle obtained at step 425, and the coordinates of the person's region calculated at step 426.

Step 431: the control instruction unit 209 increments the counter (L) by 1, and returns the control to the step 422.

Step 432: the specific person comprehensive determination unit 207 performs comprehensive determination using the results stored in the determination result storing unit 206 at steps 409, 419, and 430. The comprehensive determination is performed by reading the image pickup angle of the most similar person obtained at step 407 from the image pickup angles of the respective specific persons previously recorded in the specific person recording unit 200, searching for a result of angle closest to the angle, among the results stored in the determination result storing unit 206, and in the relation between the coincidence between the results and a certain constant value (second threshold value), when the coincidence is equal to or lower than the threshold value, comprehensively determining that the person has been detected as the specific person. As the second threshold value, a value smaller than the first threshold value is set. When the detection is determined, the process proceeds to step 433, otherwise, the process proceeds to step 434.

Step 433: the detection notification unit 208 transmits specific person notification to the terminal device 104. The transmission data includes the specific person's ID, the person's image, and the like.

Step 434: the determination result storing unit 206 deletes all the stored results. The stored results may not be deleted but overwritten. After the completion of deletion, the process returns to step 400.

Figure 5:
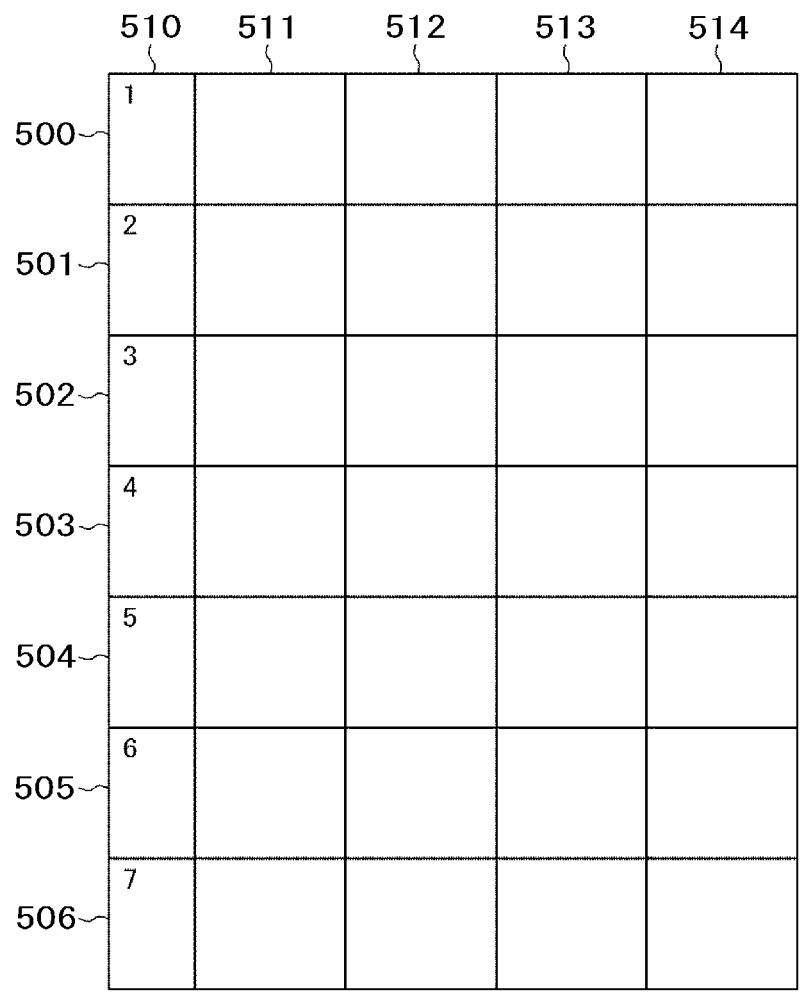
FIG. 5 is a diagram showing an aspect of stored data in a determination result storing unit in FIG. 2.

As shown in FIG. 5, in stored data 520 in the determination result storing unit 206, e.g., a collation result is stored as 1 record, and up to seven records, i.e., the results of 7 times collation are stored in records 500 to 506. FIG. 5 shows a status where all the records are vacant.

The records 500 to 506 are respectively configured with a record number cell 510, a person ID cell 511, a coincidence cell 512, an angle cell 513, and a person's region coordinates cell 514.

The record number cell 510 is a region to store a record number. The record number is a number used for record management. For example, it is a continuous integer value uniquely assigned by record.

The person ID cell 511 is a region to store a person ID of a most similar person. The person ID is information used for person identification. For example, it is a character string representing a person name, an integer value string, a symbol string, or a combination of these strings, uniquely assigned to the person, or the like.

The coincidence cell 512 is a region to store coincidence.

The angle cell 513 is a region to store an image pickup angle of an appeared person.

The person's region coordinates cell 514 is a region to store the coordinates of the appeared person's image region.

Here a person's action from appearance to leaving will be more particularly described. The appeared person here is an object of detection, i.e., a specific person E.

The data shown in FIG. 3 is previously recorded in the specific person recording unit 200. Further, for the sake of simplification of explanation, no other person than the person E appears from the appearance to the leaving of the person E. The image pickup device 101 performs image pickup at a rate of 10 frames/sec. The recording device 102 records the video image from the image pickup device 101 at a rate of 10 frames/sec. Further, the detection device 103 performs processing on the video image from the image pickup device 101 while performs sampling at a rate of 1 frame/sec.

Figure 6:
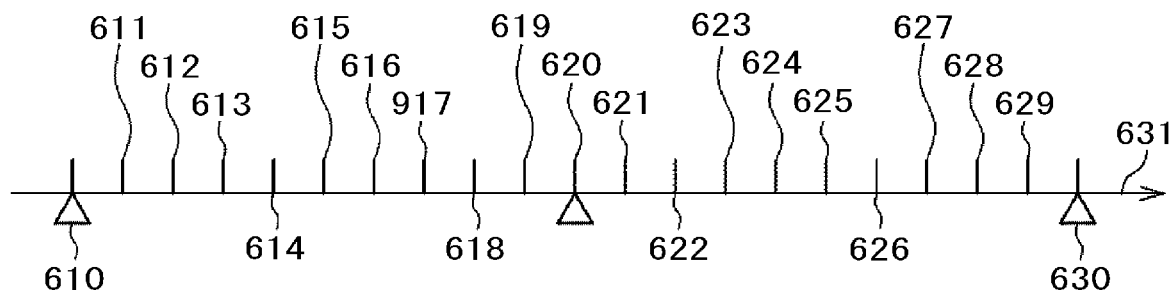
FIG. 6 is a diagram explaining timing.

In a timing diagram of FIG. 6, a horizontal axis 600 represents time series, and the right side corresponds to the future side. Timings 610 to 630 marked with a vertical line on the horizontal axis 600 indicate timing of the image obtained with the image pickup device 101 and recorded with the recording device 102. Among them, the timings 610, 620, and 630 marked with a symbol Δ under the horizontal axis 600 also indicate timing of the image subjected to processing with stationary sampling with the detection device 103. Note that it is assumed that the timing 620 is time (T). Further, it is assumed that the person E appears at the timing 614, and leaves at the timing 627. That is, the appearance section corresponds to the timings 614 to 626.

Figures 7A, 7B:
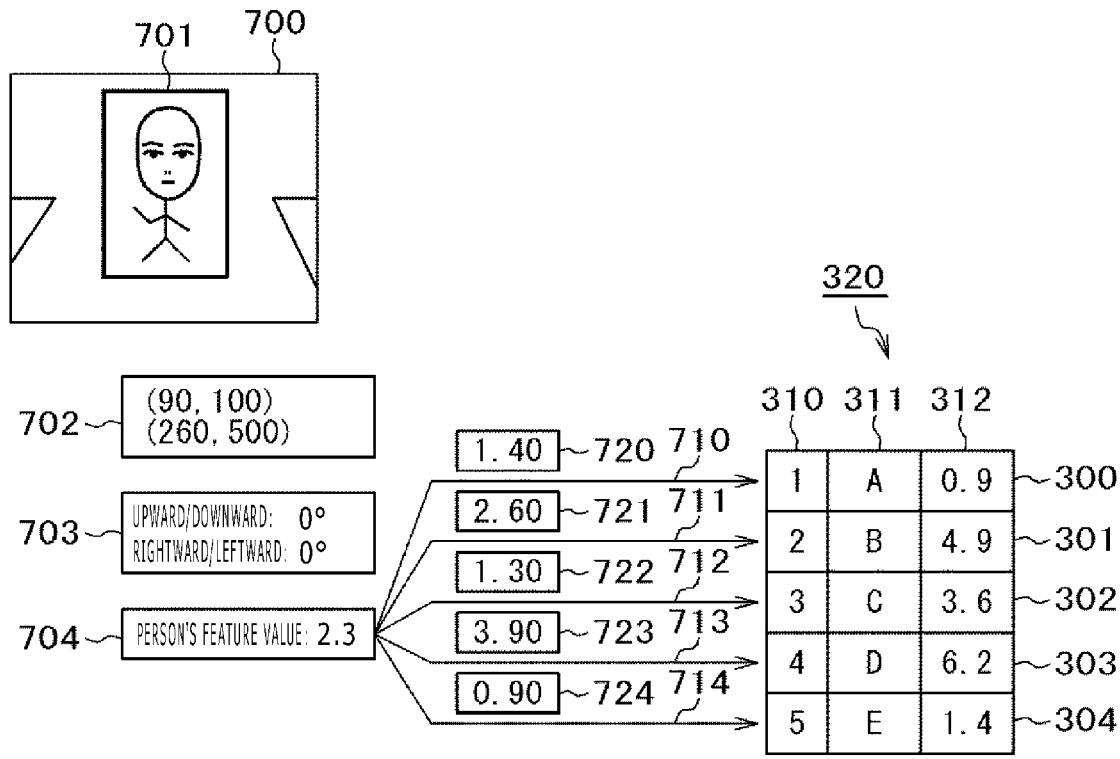
FIG. 7A is a diagram explaining the content of processing at time T.
FIG. 7B is a diagram explaining the content of processing at time T.

The content of the processing at the time (T) will be described using FIGS. 7A and 7B. The reference numerals the same as those in FIGS. 3 and 5 respectively denote the same elements.

An image 700 is an image at the time (T), i.e., the image (T) at the timing 620.

The detection device 103 obtains the image (T) from the image pickup device 101 (steps 400 to 402). Then, the detection device performs person detection and the like on all the regions of the image (steps 403 to 404). A detection region 701 indicates the person's region obtained at step 404. Further, region coordinates 702 indicate coordinate values of the detection region 701 in the image. In the present example, an upper left coordinate and a lower right coordinate of the detection region 701 are used. The origin is positioned upper left to the detection region 701 in the figure.

Next, the detection device 103 calculates an image pickup angle with respect to the detection region 701 (step 405). An angle 703 indicates the value calculated here.

Next, the detection device 103 calculates a person's feature value with respect to the detection region 701 (step 406). A person's feature value 704 indicates the value calculated here. As a person's feature value, a multidimensional value is generally used. However, in the present example, for the same of simplification of explanation, a one-dimensional small number value is used. The value will be used herein below.

Next, the detection device 103 performs all collation with respect to the record data 320 in the specific person recording unit 200, using the person's feature value 704 (step 407). Collations 710 to 714 indicate collation with the respective records in the record data 320. Coincidences 720 to 724 indicate coincidence calculated in the respective collations. In the coincidence, as the value is smaller, the similarity is higher. As a result of the all collation, the smallest coincidence is the coincidence 724. Accordingly, it is determined that the most similar person is the person E recorded in the record 304. As the coincidence, a vector scalar value in person's feature value space as a multidimensional value is frequently used. In the present example, for the sake of simplification of explanation, the absolute value of the difference of the person's feature value is used. The value will be used herein below.

Next, the detection device 103 compares the coincidence 724 of the person E as the most similar person obtained above with the previously-set first threshold value. In the present example, the first threshold value is 1.00. The coincidence 724 is 0.90, which is equal to or lower than the threshold value. Accordingly, as primary determination, it is determined that this appeared person is one of the specific persons, i.e., the person E (step 408).

Next, the detection device 103 stores a detected person ID "E" in a cell corresponding to the person ID cell 511, the value of the coincidence 724 in a cell corresponding to the coincidence cell 512, the value of the angle 730 in a cell corresponding to the angle cell 513, the values of the region coordinates 702 in a cell corresponding to the person's region coordinates cell 514, respectively, with respect to the record 500 of the stored data 520 in the determination result storing unit 206 (step 409). The stored data 520 in FIG. 7B shows the status of the stored data at this time.

The series of processing in the image 700 is as described above.

Figures 8A, 8B:
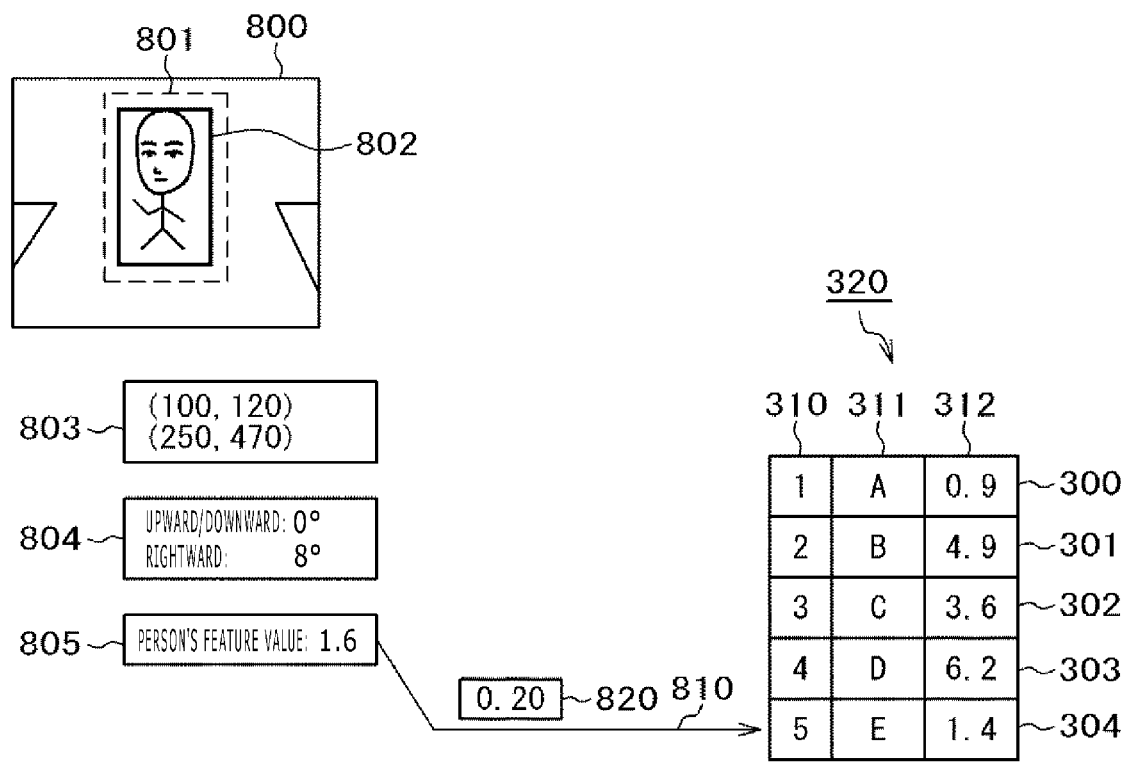
FIG. 8A is a diagram explaining the content of processing at steps 411 to 420.
FIG. 8B is a diagram explaining the content of processing at steps 411 to 420.

The content of processing at the time (T−1) will be described using FIGS. 8A and 8B.

An image 800 is the image at time (T−1), i.e., the image at the timing 619 (T−1).

The detection device 103 obtains the image (T−1) from the recording device 102 (steps 412 to 413). Then the detection device performs person detection and the like with respect the image (T−1). At this time, the person detection is performed only on a neighboring region 801 of the detection region 701. The neighboring region here is a region which includes the detection region 701 and which expands vertically and horizontally from the detection region 701. As the amount of expansion, an appropriate value is previously given in correspondence with apparent moving speed of the person in the image. In the present example, a region the same as the detection region 702 is given as the neighboring region 801. A detection region 802 indicates the person's region obtained at step 415. Further, region coordinates 803 indicate coordinate values of the detection region 802 in the image.

Next, the detection device 103 calculates a person's angle with respect to the detection region 802 (step 416). An angle 804 indicates the value calculated here.

Next, the detection device 103 calculates a person's feature value with respect to the detection region 802 (step 417). A person's feature value 805 indicates the value calculated here.

Next, the detection device 103 performs collation with respect to the record data 320 in the specific person recording unit 200 using the person's feature value 805 (step 418). At this time, the collation is performed only on the record of the person E as indicated in collation 810. Coincidence 820 is coincidence calculated in the collation 810.

Next, the detection device 103 stores a detected person ID "E" in a cell corresponding to the person ID cell 511, the value of the coincidence 820 in a cell corresponding to the coincidence cell 512, the value of the angle 804 in a cell corresponding to the angle cell 513, the values of the region coordinates 803 in a cell corresponding to the person's region coordinates cell 514, respectively, with respect to the record 501 of the stored data 520 in the determination result storing unit 206 (step 419). The stored data 520 in FIG. 8B shows the status of the stored data at this time.

The series of processing regarding the image 800 is as described above.

The detection device 103 performs the above processing retroactively by the image at the timing 617 (T−3) or until no person is detected at step 414.

The content of processing at steps 422 to 432 will be described using FIGS. 9A and 9B.

An image 900 is the image at time (T+3) i.e. the image at the timing 623 (T+3).

The detection device 103 obtains the image (T+3) from the recording device 102 (steps 423 to 424). Then the detection device performs person detection and the like with respect to the image. At this time, the detection is performed only on a neighboring region 901. A detection region 902 indicates the person's region obtained at step 426. Further, region coordinates 903 indicate coordinate values of the detection region 902 in the image.

Next, the detection device 103 calculates a person's angle with respect to the detection region 902 (step 427). An angle 904 indicates the value calculated here.

Next, the detection device 103 calculates a person's feature value with respect to the detection region 902 (step 428). A person's feature value 905 indicates the value calculated here.

Next, the detection device 103 performs collation with respect to the record data 320 in the specific person recording unit 200 using the person's feature value 905 (step 429). At this time, the collation is performed only on the record of the person E as indicated in collation 910. Coincidence 920 is the coincidence calculated in the collation 910.

Next, the detection device 103 stores the detected person ID "E" in a cell corresponding to the person ID cell 511, the value of the coincidence 902 in a cell corresponding to the coincidence cell 512, the value of the angle 904 in a cell corresponding to the angle cell 513, the values of the region coordinates 903 in a cell corresponding to the person's region coordinates cell 514, respectively, with respect to the record 506 of the stored data 520 in the determination result storing unit 206 (step 419). The stored data 520 in FIG. 9B shows the status of the stored data at this time.

The series of processing regarding the image 900 is as described above.

Next, the detection device 103 reads the value of the person E's angle previously recorded in the specific person recording unit 200. The detection device searches for a result of the closest angle from the results stored in the stored data 520. In the present example, it is the record 501. Then, the detection device reads the coincidence stored in the record 501. The detection device compares the read coincidence with the previously-set second threshold value. In the present example, the second threshold value is 0.60. The read coincidence is 0.20, which is equal to or lower than the threshold value. Accordingly, it is comprehensively determined that the appeared person is one of the specific persons, and is the person E (step 432).

The series of processing to the detection is as described above.

As it has been shown, in the present example, collation is performed in an image closest to the angle previously recorded in the specific person recording unit 200. In general, an image having a closer angle has a higher accuracy. Accordingly, in correspondence with the present example, it is possible to obtain higher detection accuracy in a specific person detection system. Further, in the present example, even when person's images from various angles are not previously registered, it is possible to obtain higher detection accuracy. Further, in the present example, even when collation on steady basis is not performed at a high frame rate, it is possible to obtain higher detection accuracy.

In the description, for the sake of simplification of explanation, the number of image pickup devices, that of the detection devices, that of the recording devices and that of the terminal devices are respectively one. However, respectively plural these devices may be connected with the network.

Further, similarly, respectively one image pickup device and detection device or recording device and detection device oppositely operate, however, it may be configured such that one detection device operate with respect to plural image pickup devices and recording devices. On the contrary, it may be configured such that plural detection devices operate with respect to one image pickup device and one recording device.

Further, similarly, respectively one detection device and terminal device oppositely operate, however, it may be configured such that one terminal device operates with respect to plural detection devices. On the contrary, it may be configured such that plural terminal devices operate with respect to one detection device.

Further, similarly, the image pickup device, the recording device and the detection device are independent devices, however, they may be implemented as the same device.

Further, similarly, the detection device and the terminal device are independent devices, however, they may be implemented as the same device.

Further, similarly, the specific person detection system is shown as the object of the application of the invention, however, the invention may be implemented with a detection system for not only a specific person but a specific vehicle, another specific object, or the like, as the object of application of the invention.

Example 2

Figure 10:
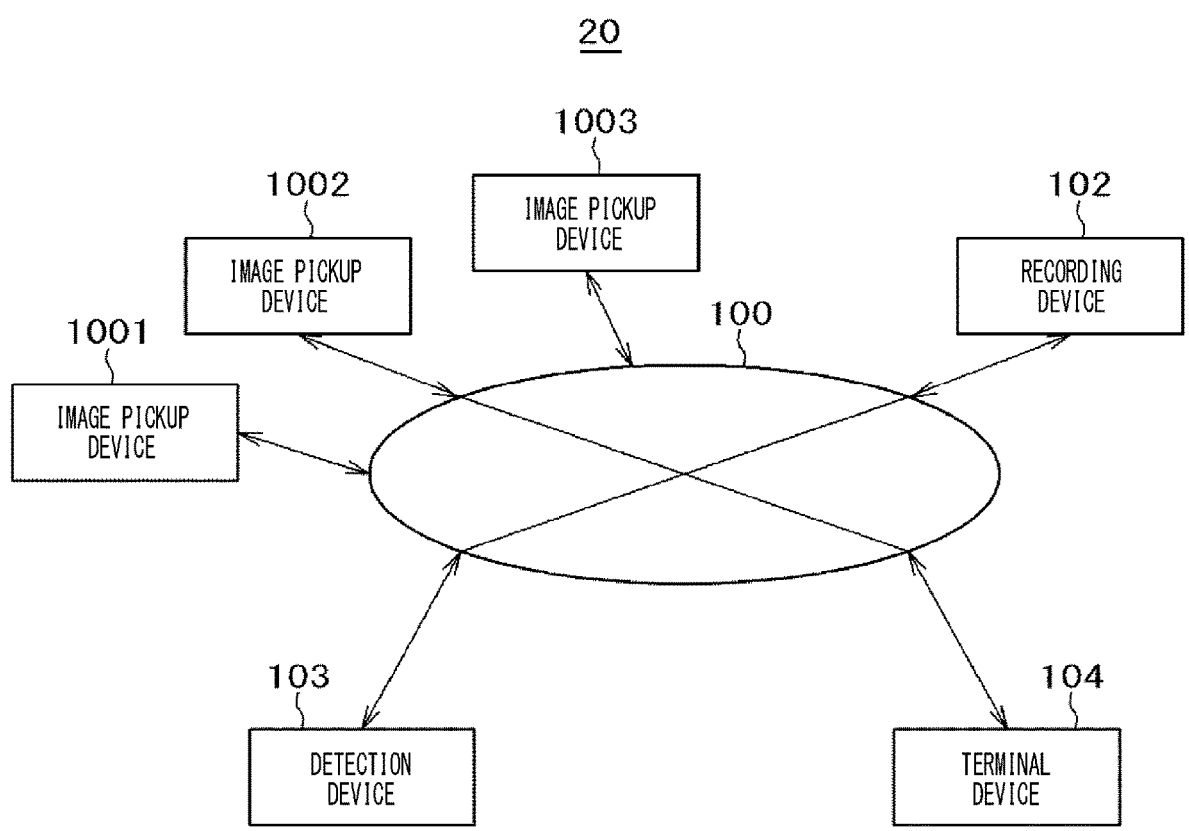
FIG. 10 is a diagram showing the device configuration of the specific person detection system according to an example 2.

Next, the device configuration of the specific person detection system according to an example 2 will be described using FIG. 10. The reference numerals the same as those in FIG. 1 denote the same devices.

In a specific person detection system 20, image pickup devices 1001 to 1003, the recording device 102, the detection device 103, and the terminal device 104 are connected to the network 100, in a mutually communicable status.

The image pickup devices 1001 to 1003 are devices the same as the image pickup device 101. In the present example, three image pickup devices are connected to the system. The image pickup devices 1001 to 1003 are installed so as to perform image pickup on the same location from different angles. The detection device 103 stores correspondence information among the image pickup devices 1001 to 1003 performing image pickup on the same location in a memory device. With this configuration, the detection device 103 grasps the image pickup devices performing image pickup on the same location.

In the present example, the recording device 102 always records video images from the image pickup devices 1001 to 1003.

Figure 11A:
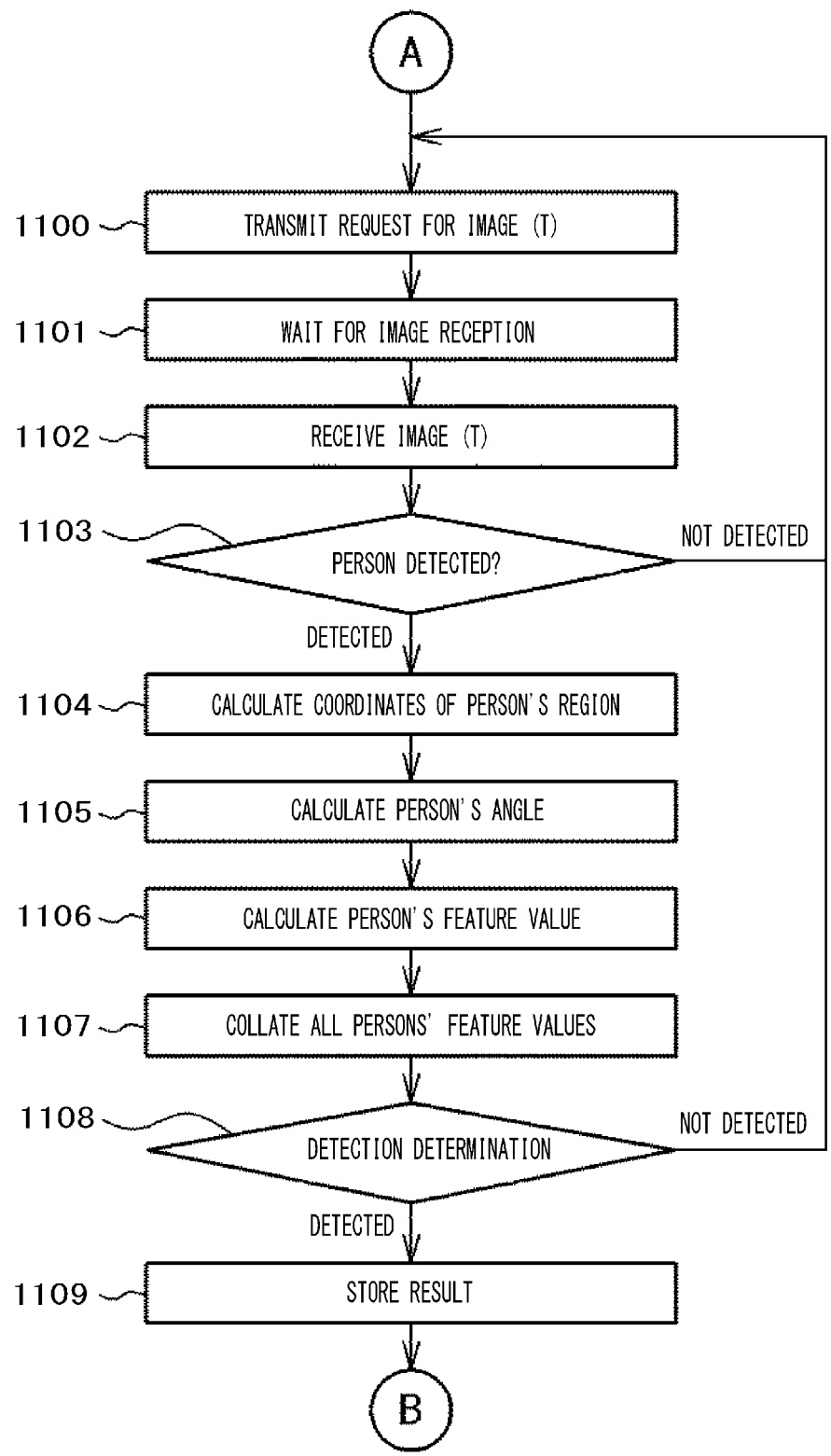
FIG. 11A is a diagram showing the flow of processing in the detection device in FIG. 10.
Figure 11B:
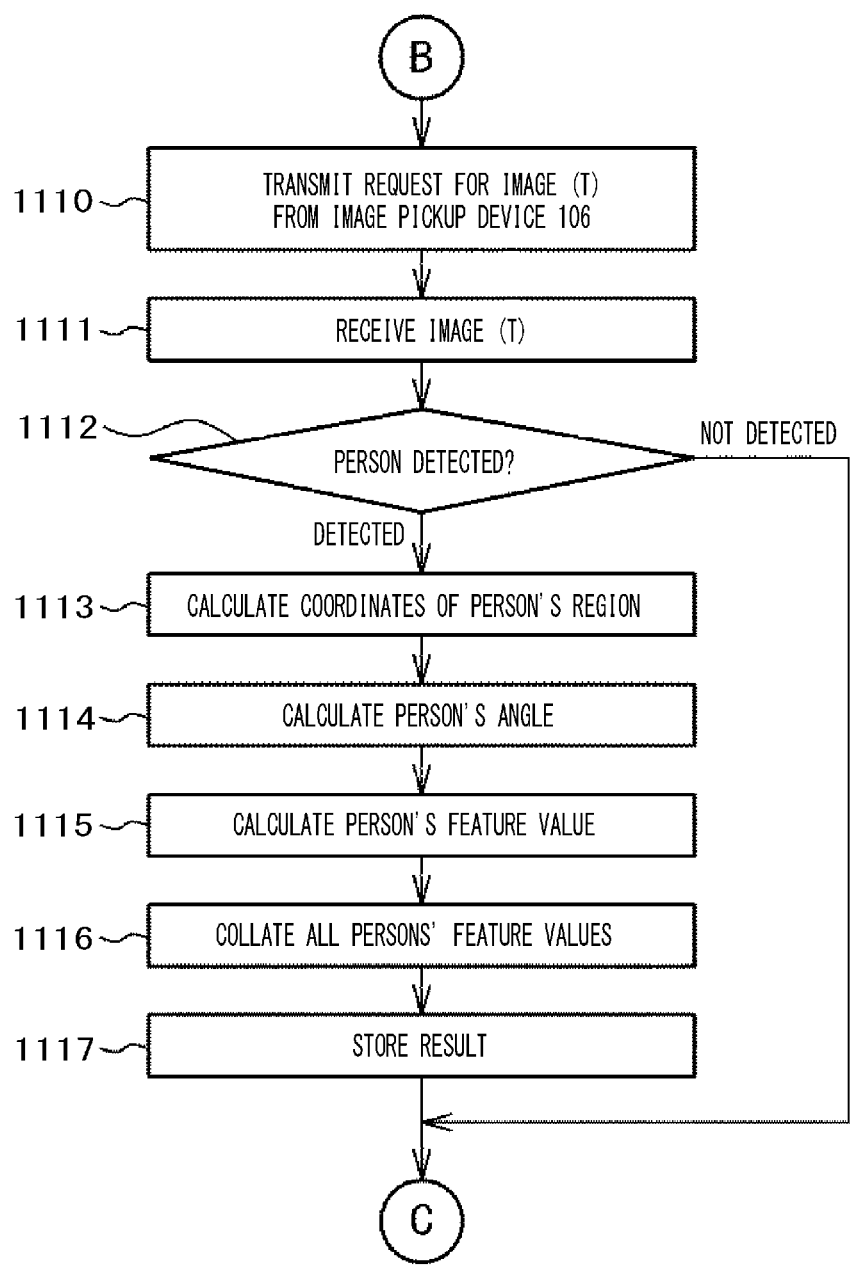
FIG. 11B is a diagram showing the flow of processing in the detection device in FIG. 10.
Figure 11C:
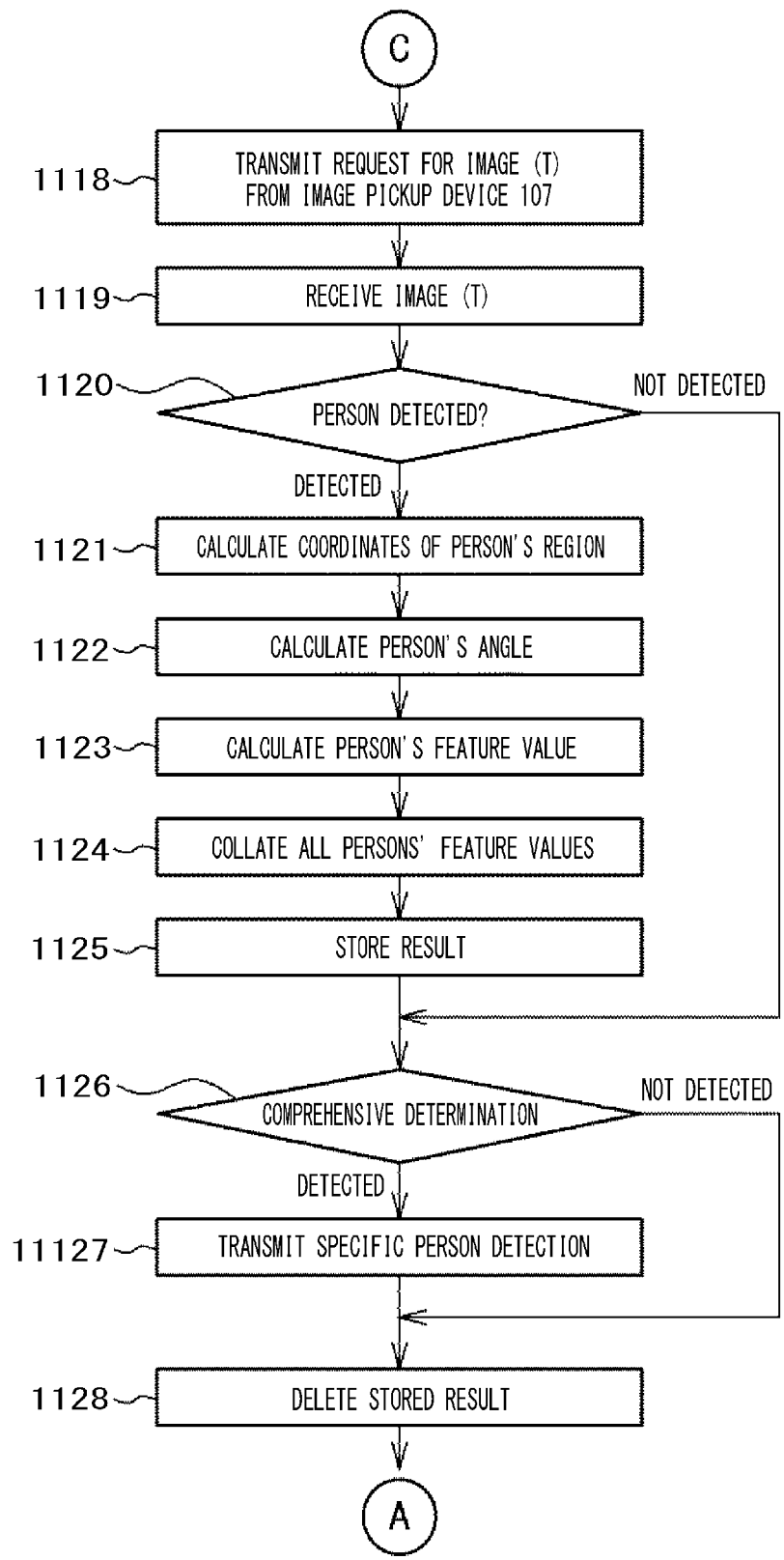
FIG. 11C is a diagram showing the flow of processing in the detection device in FIG. 10.

The flow of processing in the detection device 103 will be described using FIGS. 11A to 11C.

Step 1100: the control instruction unit 209 calculates image time (T) of an image to be obtained next. When specific person detection is performed by several frames, time several frames ahead of current time is calculated as the image time (T). Then, the image reception unit 201 requests the image pickup device 1001 to output an image (T).

Step 1101: the image reception unit 201 performs image reception waiting. When image incoming from the image pickup device 1001 is detected, the process proceeds to step 1102.

Step 1102: the image reception unit 201 receives an image from the image pickup device 1001. The image at the reception time (T) is the image (T).

Step 1103: the person detection unit 202 performs person detection with respect to the received image data. The person detection is performed as in the case of step 403. As a result of above detection, when a person is detected, the process proceeds to step 1104. When a person is not detected, the process returns to step 1100.

Step 1104: the person detection unit 202 calculates person's region coordinates of the person detected at step 1103.

Step 1105: the person's angle calculation unit 203 calculates an angle with respect to the person's region image calculated at step 1104. The calculation of the person's angle is the same as in the case of step 405.

Step 1106: the person's feature value extraction unit 204 calculates a person's feature value with respect to the person's region image calculated at step 1104. The person's feature value is the same as in the case of step 406.

Step 1107: the specific person determination unit 205 performs all collation on the person's feature value. More particularly, the person's feature value calculated at step 1106 is collated (coincidence calculation) sequentially with respect to all the persons' feature values of the respective specific persons previously recorded in the specific person recording unit 200. A feature value with the smallest coincidence is found. A person having this feature value is determined as a most similar person. The coincidence is the same as in the case of step 407.

Step 1108: the specific person determination unit 205 performs specific person detection determination. The detection determination is the same as in the case of step 408. When detection is determined, the process proceeds to step 1109, otherwise, the process returns to step 1100.

Step 1109: the determination result storing unit 206 stores the result obtained with respect to the image (T) and saves it. Note that the data as the object of storage includes the coincidence and the person ID of the most similar person obtained at step 1108, the angle obtained at step 1105, and the coordinates of the person's region calculated at step 1104. The aspect of the stored data is the same as that in FIG. 5.

Step 1110: the image reception unit 201 requests the recording device 102 to output an image (T) from the image pickup device 1002.

Step 1111: the image reception unit 201 receives the image (T) from the image pickup device 1002, from the recording device 102.

Step 1112: the person detection unit 202 performs person detection with respect to the received image data as to the same person as the person detected at step 1103. The method for person detection is the same as in the case of step 1103. The identification between the person detected at step 1103 and the person detected at the present step is the same as in the case of step 414. Note that in the present example, as the image pickup position of the image pickup device 1001 and that of the image pickup device 1002 are different, the installation position relationship between them is previously obtained, and the correspondence between the image coordinates between the respective images is previously obtained by geometric calculation. As a result of above detection, when the same person is detected, the process proceeds to step 1113. When the same person is not detected, the process proceeds to step 1108. The person detection unit 202 calculates person's region coordinates of the person detected at step 1112.

Step 1114: the person's angle calculation unit 203 calculates an angle with respect to the person's region image calculated at step 1113. The method for angle calculation is the same as in the case of step 405.

Step 1115: the person's feature value extraction unit 204 calculates a person's feature value with respect to the person's region image calculated at step 1113. The method for calculation of person's feature value is the same as in the case of step 406.

Step 1116: the specific person determination unit 205 performs collation on the person's feature value. More particularly, the feature value of the most similar person obtained at step 1107 is read from the persons' feature values of the respective specific persons previously recorded in the specific person recording unit 200. The read feature value is collated with the person's feature value calculated at step 1115, and coincidence is calculated. The method for coincidence calculation is the same as in the case of step 407.

Step 1117: the determination result storing unit 206 stores the result obtained with respect to the image (T) from the image pickup device 1002 and saves it. Note that the data as the object of storage includes the coincidence obtained at step 1116, the angle obtained at step 1114, and the coordinates of the person's region calculated at step 1113.

Step 1118: the image reception unit 201 requests the recording device 102 to output an image (T) from the image pickup device 1003.

Step 1119: the image reception unit 201 receives the image (T) from the image pickup device 1003, from the recording device 102.

Step 1120: the person detection unit 202 performs detection with respect to the received image data as to the same person as the person detected at step 1103. The method for person detection is the same as in the case of step 1103. The identification between the person detected at step 1103 and the person detected at the present step is the same as that at step 414. Note that in the present example, as the image pickup position of the image pickup device 1001 and that of the image pickup device 1003 are different, the installation position relationship between them is previously obtained, and the correspondence between the image coordinates between the respective images is previously obtained by geometric calculation. As a result of above detection, when the same person is detected, the process proceeds to step 1121. When the same person is not detected, the process proceeds to step 1126.

Step 1121: the person detection unit 202 calculates person's region coordinates of the person detected at step 1120.

Step 1122: the person's angle calculation unit 203 calculates an angle with respect to the person's region image calculated at step 1121. The method for angle calculation is the same as in the case of step 405.

Step 1123: the person's feature value extraction unit 204 calculates a person's feature value with respect to the person's region image calculated at step 1121. The method for calculation of person's feature value is the same as in the case of step 406.

Step 1124: the specific person determination unit 205 performs collation on the person's feature value. More particularly, the feature value of the most similar person obtained at step 1107 is read from the persons' feature values of the respective specific persons previously recorded in the specific person recording unit 200. The read feature value is collated with the person's feature value calculated at step 1123, and coincidence is calculated. The method for coincidence calculation is the same as in the case of step 407.

Step 1125: the determination result storing unit 206 stores the result obtained with respect to the image (T) from the image pickup device 1003 and saves it. Note that the data as the object of storage includes the coincidence obtained at step 1124, the angle obtained at step 1122, and the coordinates of the person's region calculated at step 1121.

Step 1126: the specific person comprehensive determination unit 207 performs comprehensive collation using the results stored in the determination result storing unit 206 at steps 1109, 1117 and 1125. The comprehensive determination is performed by reading the angle of the most similar person obtained at step 1107 from the persons' angles of the respective specific persons previously recorded in the specific person recording unit 200, searching for a result of angle closest to the angle, among the results stored in the determination result storing unit 206, and in the relation between the coincidence between the results and a certain constant value (second threshold value), when the coincidence is equal to or lower than the threshold value, comprehensively determining that the person has been detected as the specific person. As the second threshold value, a value smaller than the first threshold value is set. When the detection is determined, the process proceeds to step 1127, otherwise, the process proceeds to step 1128.

Step 1127: the detection notification unit 208 transmits the specific person notification to the terminal device 104. The transmission data includes the specific person's ID, the person's image, and the like.

Step 1128: the determination result storing unit 206 deletes all the stored results. The stored results may not be deleted but overwritten. After the completion of deletion, the process returns to step 1100.

Figures 12A, 12B:
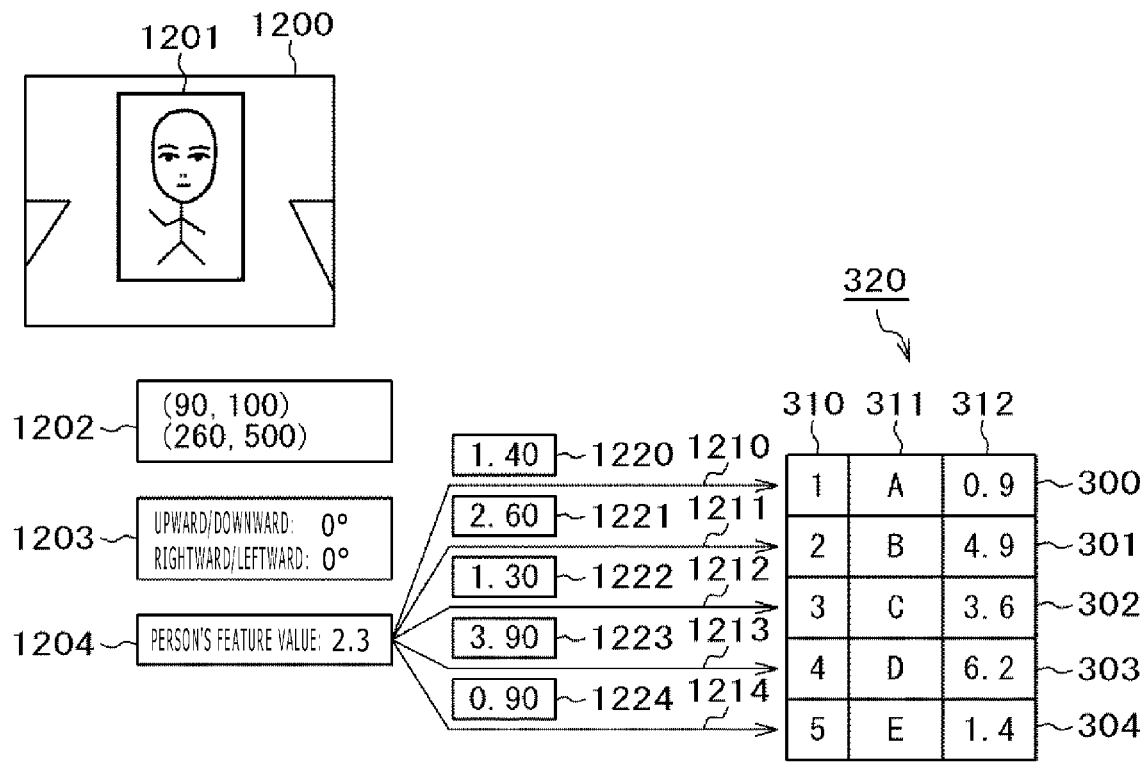
FIG. 12A is a diagram explaining the content of processing at time T.
FIG. 12B is a diagram explaining the content of processing at time T.

The content of processing at the time (T) will be described using FIGS. 12A and 12B. The reference numerals the same as those in FIGS. 3 and 5 respectively denote the same elements.

An image 1200 is an image (T) from the image pickup device 1001 at the time (T).

The detection device 103 obtains the image (T) from the image pickup device 1001 (steps 1100 to 1102). Then, the detection device performs person detection and the like with respect to the entire region of the image (steps 1103 to 1104). A detection region 1201 indicates the person's region obtained at step 1104. Further, region coordinates 1202 indicate coordinate values of the detection region 1201 in the image. In the present example, an upper left coordinate and a lower right coordinate of the detection region 1201 are used.

Next, the detection device 103 calculates a person's angle with respect to the detection region 1201 (step 1105). An angle 1203 indicates the value calculated here.

Next, the detection device 103 calculates a person's feature value with respect to the detection region 1201 (step 1106). A person's feature value 1204 indicates the value calculated here.

Next, the detection device 103 performs all collation with respect to the record data 320 in the specific person recording unit 200 using the person's feature value 1204 (step 1107). Collations 1210 to 1214 indicate collation with the respective records of the record data. Coincidences 1220 to 1224 indicate coincidences calculated in the respective collations. In the coincidence, as the value is smaller, the degree of similarity is higher. As a result of all collation, as the smallest coincidence is the coincidence 1224, it is determined that the most similar person is the person E recorded in the record 304.

Next, the detection device 103 compares the coincidence 1224 of the person E as the most similar person obtained above with the previously-set first threshold value. In the present example, the first threshold value is 1.00. The coincidence 1224 is 0.90 which is equal to or lower than the threshold value. Accordingly, it is primarily determined that the appeared person is one of the specific persons, and is the person E (step 1108).

Next, the detection device 103 stores the detected person's ID "E" in a cell corresponding to the person's ID cell 511, the value of the coincidence 1224 in a cell corresponding to the coincidence cell 512, the angle 1203 in a cell corresponding to the angle cell 513, the values of the region coordinates 1202 in a cell corresponding to the person's region coordinates cell 514, respectively, with respect to the record 500 of the stored data 520 in the determination result storing unit 206 (step 1109). The stored data 520 in FIG. 12B shows the status of the stored data at this time.

The series of processing at steps 1100 to 1109 is as described above.

Figures 13A, 13B:
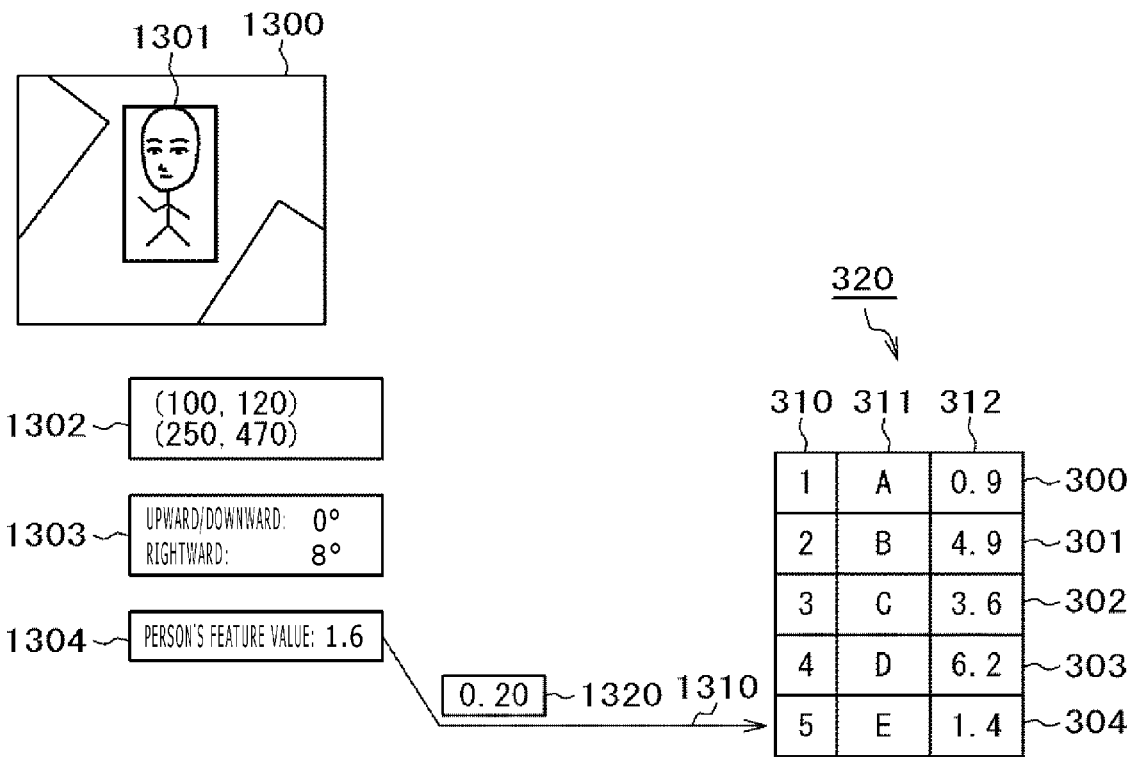
FIG. 13A is a diagram explaining the content of processing at steps 1110 to 1117.
FIG. 13B is a diagram explaining the content of processing at steps 1110 to 1117.

The content of processing at steps 1110 to 1117 will be described using FIGS. 13A and 13B.

An image 1300 is an image (T) at the time (T) from the image pickup device 1002.

The detection device 103 obtains the image (T) from the image pickup device 1002, from the recording device 102 (steps 1110 to 1111). The detection device performs person detection and the like with respect to the entire region of the image (steps 1112 to 1113). A detection region 1301 indicates the person's region obtained at step 1113. Further, region coordinates 1302 indicate coordinate values of the detection region 1301 in the image.

Next, the detection device 103 calculates a person's angle with respect to the detection region 1301 (step 1114). An angle 1303 indicates the value calculated here.

Next, the detection device 103 calculates a person's feature value with respect to the detection region 1301 (step 1115). A person's feature value 1304 indicates the value calculated here.

Next, the detection device 103 performs collation with respect to the record data 320 in the specific person recording unit 200 using the person's feature value 1304 (step 1116). At this time, the collation is performed only on the person E's record as shown in collation 1310. Coincidence 1320 is the coincidence calculated in the collation 1310.

Next, the detection device 103 stores a detected person ID "E" in a cell corresponding to the person ID cell 511, the value of the coincidence 1320 in a cell corresponding to the coincidence cell 512, the angle 1303 in a cell corresponding to the angle cell 513, the values of the region coordinates 1302 in a cell corresponding to the person's region coordinates cell 514, respectively, with respect to the record 501 of the stored data 520 in the determination result storing unit 206 (step 1117). Stored data 1330 in FIG. 13B shows the status of the stored data at this time.

The series of processing at steps 1110 to 1117 is as described above.

Figures 14A, 14B:
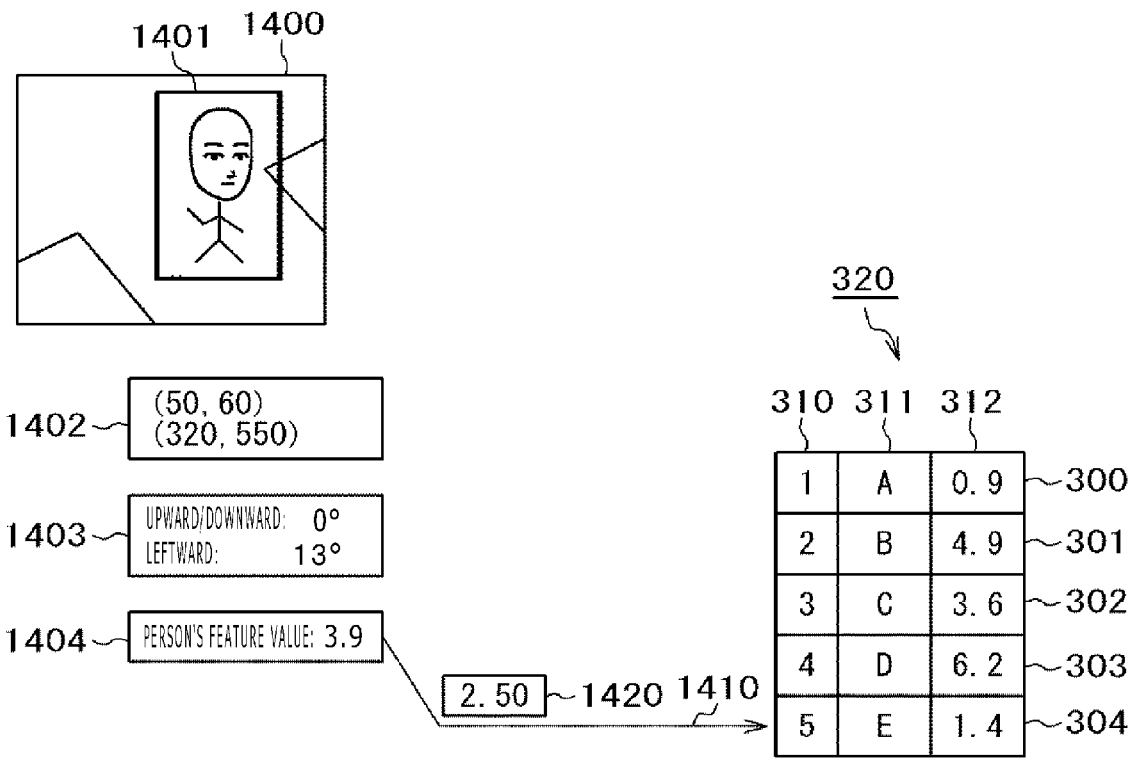
FIG. 14A is a diagram explaining the content of processing at steps 1118 to 1126.
FIG. 14B is a diagram explaining the content of processing at steps 1118 to 1126.

The content of processing at steps 1118 to 1126 will be described using FIGS. 14A and 14B.

An image 1400 is an image (T) at the time (T) from the image pickup device 1003.

The detection device 103 obtains the image (T) from the image pickup device 1003, from the recording device 102 (steps 1118 to 1119). The detection device performs person detection and the like with respect to the entire region of the image (steps 1120 to 1121). A detection region 1401 indicates the person's region obtained at step 1121. Further, region coordinates 1402 indicate coordinate values of the detection region 1401 in the image.

Next, the detection device 103 calculates a person's angle with respect to the detection region 1401 (step 1122). An angle 1403 indicates the value calculated here.

Next, the detection device 103 calculates a person's feature value with respect to the detection region 1401 (step 1123). A person's feature value 1404 indicates the value calculated here.

Next, the detection device 103 performs collation with respect to the record data 320 in the specific person recording unit 200 using the person's feature value 1404 (step 1124). At this time, the collation is performed only on the person E's record as shown in collation 1410. Coincidence 1420 is the coincidence calculated in the collation 1410.

Next, the detection device 103 stores a detected person ID "E" in a cell corresponding to the person ID cell 511, the value of the coincidence 1420 in a cell corresponding to the coincidence cell 512, the angle 1403 in a cell corresponding to the angle cell 513, the values of the region coordinates 1402 in a cell corresponding to the person's region coordinates cell 514, respectively, with respect to the record 502 of the stored data 520 in the determination result storing unit 206 (step 1125). The stored data 520 in FIG. 14B shows the status of the stored data at this time.

Next, the detection device 103 reads the person E's angle previously recorded in the specific person recording unit 200. The detection device searches for a result of the closest angle from the results stored in stored data 1430. In the present example, it is the record 501. Then the coincidence stored in the record 501 is read. The read coincidence is compared with the previously-set second threshold value. In the present example, the second threshold value is 0.60. The read coincidence is 0.20 which is equal to or lower than the threshold value. Accordingly, it is comprehensively determined that the appeared person is one of the specific persons, and is the person E (step 1126).

The series of processing to the detection is as described above.

As it has been shown, in the present example, collation is performed in an image closest to the angle previously recorded in the specific person recording unit 200. In general, an image having a closer angle has a higher accuracy. Accordingly, in correspondence with the present example, it is possible to obtain higher detection accuracy in a specific person detection system. Further, in the present example, even when person's images from various angles are not previously registered, it is possible to obtain higher detection accuracy. It is possible to obtain higher effect than that obtained in the example 1 by installing the image pickup devices such that the difference of image pickup angle between the plural image pickup devices is larger than a direction fluctuation width of a walking person. Further, in the present example, even when collation on steady basis is not performed at a high frame rate, it is possible to obtain higher detection accuracy.

In the description, for the sake of simplification of explanation, the number of image pickup devices on the same location is three. However, they may be implemented with plural devices other than three.

Further, similarly, the image pickup device, the recording device and the detection device are independent devices, however, they may be implemented as the same device.

Further, similarly, the detection device and the terminal device are independent devices, however, they may be implemented as the same device.

Further, similarly, the specific person detection system is shown as the object of the application of the invention, however, the invention may be implemented with a detection system for not only a specific person but a specific vehicle, a specific object, or the like, as the object of application of the invention.

Example 3

Figure 15:
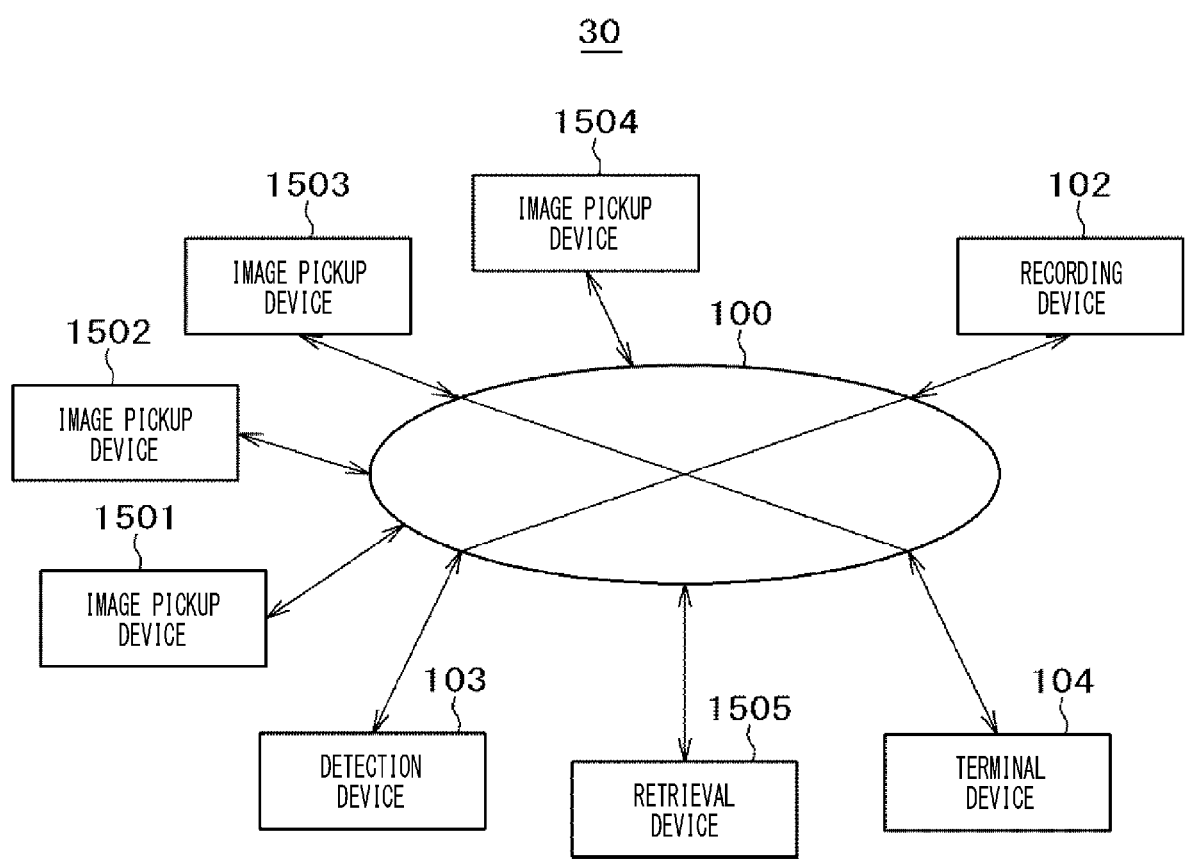
FIG. 15 is a diagram showing the device configuration of the specific person detection system according to an example 3.

Next, the device configuration of the specific person detection system according to an example 3 will be described using FIG. 15. The reference numerals the same as those in FIG. 1 denote the same devices.

In a specific person detection system 30, image pickup devices 1501 to 1504, the recording device 102, the detection device 103, the terminal device 104, and a retrieval device 1505 are connected to the network 100 in a mutually communicable status.

The image pickup devices 1501 to 1504 are the same as the image pickup device 101. In the present example, the four image pickup devices are connected to the system.

The retrieval device 1505 is a device such as a computer having an arithmetic circuit such as a CPU, a temporary memory such as a RAM, a recording medium such as an HDD, a data transmission bus, an external input/output interface, a power source circuit, and the like.

The retrieval device 1505 stores image data from the recording device 102, inputted from the network in the external input/output interface, into the temporary memory. The retrieval device performs various arithmetic operations related to similar image retrieval with respect to the stored image data using the arithmetic circuit. The recording medium holds a set of software application programs for similar image retrieval, an OS (Operation System), a database for storing feature values for similar image retrieval and the like. The result of similar image retrieval is outputted from the external input/output interface to the network 100.

In the present example, the recording device 102 always records video images from the image pickup devices 1501 to 1504. Further, the retrieval device 1505 always collects the video images from the image pickup devices 1501 to 1504 recorded with the recording device 102, generates a database, in a similar-image retrieval executable status. The details of the retrieval device 1505 will be described later.

FIG. 16 shows an example of the positional relationship of installation of the above four image pickup devices.

As shown in FIG. 16, a passage 1600 indicates a passage on which a person walks. A route 1601 indicates a route of the person E's walk. Locations 1611 to 1614 respectively indicate the installation positions of the image pickup devices 1501 to 1504. Image pickup areas 1621 to 1624 respectively indicate the range of image pickup with the image pickup devices 1501 to 1504. The person E walks through the image pickup areas 1621, 1622 and 1623 in this order on the route 1601.

The distance between the image pickup areas is previously measured upon installation of the image pickup devices and stored with the control instruction unit 209 of the detection device 103.

The aspect of distance data between the image pickup areas in the control instruction unit 209 will be described using FIG. 17.

Distance data 1700 holds distances among the image pickup areas in a round-robin manner. In the present example, the distances among four image pickup areas are stored. A column 1701 holds the distances regarding the image pickup area 1621 to other image pickup areas, and a column 1702 holds the distances regarding the image pickup area 1622 to other image pickup areas. The columns 1703 and 1704 similarly hold the distances. A cell 1711 holds the distance between the image pickup areas 1621 and the 1622. In the present example, as a distance value, seconds, as required time for walking between the areas are used. Hereinbelow, the same distance value will be used. A cell 1712 holds the distance between the image pickup areas 1621 and 1623, and a cell 1713 holds the distance between the image pickup areas 1621 and 1624, respectively. In the present example, required time is used as a stored distance value, however, use of a way (length) or the like may be employed.

Figure 18B:
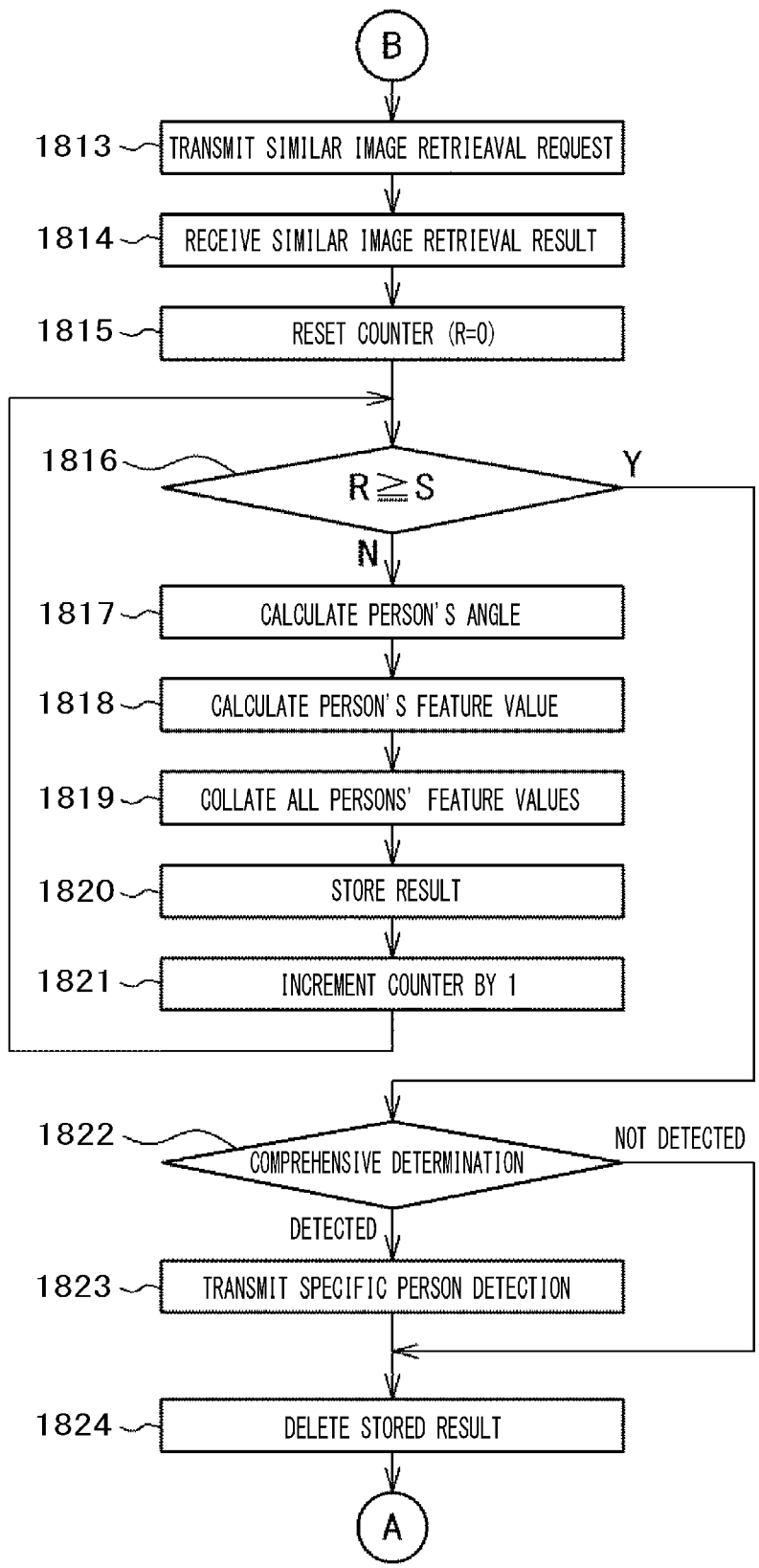
FIG. 18B is a diagram showing the flow of processing in the detection device in FIG. 15.

The flow of processing in the detection device 103 will be described using FIGS. 18A and 18B.

At step 1800, the control instruction unit 209 of the detection device 103 calculates image time (T) to be obtained next from the image pickup device 1501. When specific person detection is performed by several frames, time several frames ahead of current time is calculated as image time (T). Then, the image reception unit 201 requests the image pickup device 1501 to output an image (T).

Step 1801: the image reception unit 201 performs image reception waiting. When image incoming from the image pickup device 1501 is detected, the process proceeds to step 1802.

Step 1802: the image reception unit 201 receives an image from the image pickup device 1501. The image at the reception time (T) is the image (T).

Step 1803: the person detection unit 202 performs person detection with respect to the received image data. The person detection is the same as in the case of step 403. As a result of the above, when a person is detected, the process proceeds to step 1804. When a person is not detected, the process returns to step 1800.

Step 1804: the person detection unit 202 calculates a person's region coordinates of the person detected at step 1803.

Step 1805: the person's angle calculation unit 203 calculates an image pickup angle with respect to the person's region image calculated at step 1804. The calculation of person's image pickup angle is the same as in the case of step 405.

Step 1806: the person's feature value extraction unit 204 calculates a person's feature value with respect to the person's region image calculated at step 1804. The person's feature value is the same as in the case of step 406.

Step 1807: the specific person determination unit 205 performs all collation on the person's feature value. More particularly, the person's feature value calculated at step 1806 is collated (coincidence calculation) sequentially with respect to all the persons' feature values of the respective specific persons previously recorded in the specific person recording unit 200. A feature value with the smallest coincidence is found. A person having this feature value is determined as a most similar person. Note that the coincidence is the same as in the case of step 407.

Step 1808: the specific person determination unit 205 performs specific person detection determination. The detection determination is the same as in the case of step 408. When detection is determined, the process proceeds to step 1809, otherwise, the process returns to step 1800.

Step 1809: the determination result storing unit 206 stores the result obtained with respect to the image (T) and saves it. Note that the data as the object of storage includes the coincidence and the person ID of the most similar person obtained at step 1808, the angle obtained at step 1805, and the coordinates of the person's region calculated at step 1804. The aspect of the stored data is the same as in the case of FIG. 5.

Step 1810: the control instruction unit 209 refers to the distance data 1700, and calculates a proximity image pickup area of the image pickup device 1501 that obtained the image (T). The proximity image pickup area is an image pickup area with a distance to the image pickup device 1501 that obtained the image (T) in short-distance relationship equal to or lower than a certain constant value. There may be plural proximity image pickup areas. Further, although not shown in FIG. 18, when a proximity image pickup area does not exist at step 1810, the process proceeds to step 1822.

Step 1811: predicted arrival time (TF) to the farthest image pickup area from the proximity image pickup area, obtained at step 1810 of the person detected at step 1803, is calculated. The predicted farthest arrival time is obtained by calculation from the distance value stored in the distance data 1700.

Step 1812: the control instruction unit 209 waits by the time (TF). After the arrival of the time (TF), the process proceeds to step 1813.

Step 1813: the control instruction unit 209 requests the retrieval device 1505 to perform similar image retrieval with respect to the person's region of the image (T) calculated at step 1804. At this time, as a condition regarding image pickup time, the time from the time (T) and before the time (TF), and as a condition regarding image pickup area, the proximity image pickup area obtained at step 1810, and the similarity equal to or higher than a predetermined constant value, are given as narrowing conditions for the similar image retrieval.

Step 1814: the control instruction unit 209 receives a retrieval result from the retrieval device 1505. The retrieval result includes an image (R) and coordinates of a person's region in the image. Note that R is e.g. an integer value when the number of images included in the retrieval result is five and R=1 to 5 holds. Further, 5, as a maximum value of R, is stored as a retrieval result number S.

Step 1815: the control instruction unit 209 resets a counter (R) to 0.

Step 1816: the control instruction unit 209 compares the counter (R) with the retrieval result number (S). When R is less than S, the process proceeds to step 1817. When R is equal to or greater than S, the process proceeds to step 1822.

Step 1817: the person's angle calculation unit 203 calculates an image pickup angle with respect to the person's region obtained from the image (R) and its person's region obtained at step 1814. The method for angle calculation is the same as in the case of step 405.

Step 1818: the person's feature value extraction unit 204 calculates a person's feature value with respect to the person's region obtained from the image (R) and its person's region coordinates obtained at step 1814. The method for calculation of person's feature value is the same as in the case of step 406.

Step 1819: the specific person determination unit 205 performs collation on the person's feature value. More particularly, the feature value of the most similar person obtained at step 1807 is read from the persons' feature values of the respective specific persons previously recorded in the specific person recording unit 200. The specific person determination unit collates the read feature value with the person's feature value calculated at step 1818, and calculates coincidence. The method for coincidence calculation is the same as in the case of step 407.

Step 1820: the determination result storing unit 206 stores the result obtained with respect to the image (R) and saves it. Note that the data as the object of storage includes the coincidence obtained at step 1819, and the image pickup angle obtained at step 1817.

Step 1821: the control instruction unit 209 increments the counter (R)L by 1, and returns the control to step 1816.

Step 1822: the specific person comprehensive determination unit 207 performs comprehensive determination using the results stored in the determination result storing unit 206 at steps 1809 and 1820. The comprehensive determination is performed by reading the image pickup angle of the most similar person obtained at step 1807 from the image pickup angles of the respective specific persons previously recorded in the specific person recording unit 200, searching for a result of image pickup angle closest to the image pickup angle, among the results stored in the determination result storing unit 206, and in the relation between the coincidence between the results and a certain constant value (second threshold value), when the coincidence is equal to or lower than the threshold value, comprehensively determining that the person has been detected as the specific person. As the second threshold value, a value smaller than the first threshold value is set. When the detection is determined, the process proceeds to step 1823, otherwise, the process proceeds to step 1824.

Step 1823: the detection notification unit 208 transmits the specific person notification to the terminal device 104. The transmission data includes the specific person's ID, its person image, and the like.

Step 1824: the determination result storing unit 206 deletes all the stored results. The stored results may not be deleted but overwritten. After the completion of deletion, the process returns to step 1800.

The action when the object of detection, i.e., the person E as the specific person, walks on the route 1601 in the passage 1600 will be more particularly described. The person E appears in the image pickup area 1621 at the time (T). Further, the data shown in FIG. 3 is previously recorded in the specific person recording unit 200. Further, for the sake of simplification of explanation, no other person than the person E appears from the appearance to the leaving of the person E.

Figures 19A, 19B:
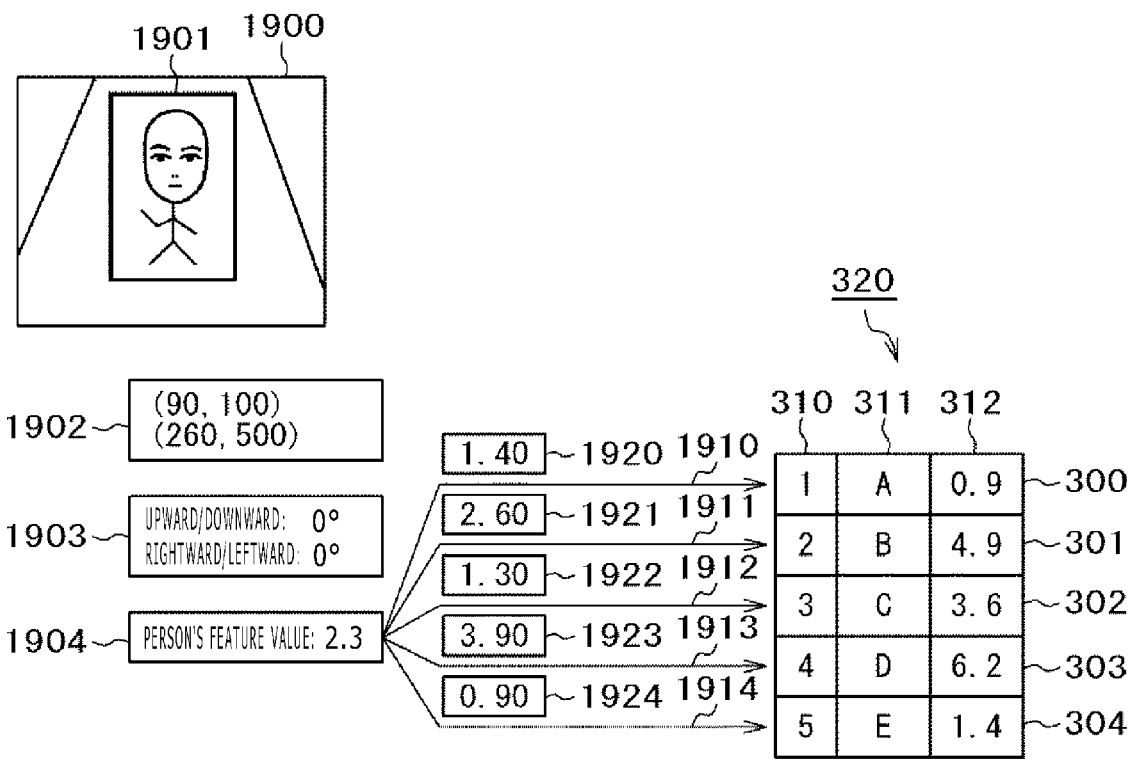
FIG. 19A is a diagram explaining the content of processing at time T.
FIG. 19B is a diagram explaining the content of processing at time T.

The content of processing at the time (T) will be described using FIGS. 19A and 19B. The reference numerals the same as those in FIGS. 3 and 5 respectively denote the same elements.

An image 1900 is an image (T) obtained by image pickup with respect to the image pickup area 1621 with the image pickup device 1501 at the time (T).

The detection device 103 obtains the image (T) from the image pickup device 1501 (steps 1800 to 1802). Then, the detection device performs person detection and the like with respect to the entire region of the image (steps 1803 to 1804). A detection region 1901 indicates the person's region obtained at step 1804. Further, region coordinates 1902 indicate coordinate values of the detection region 1901 in the image. In the present example, an upper left coordinate and a lower right coordinate of the detection region 1901 are used.

Next, the detection device 103 calculates an image pickup angle with respect to the detection region 1901 (step 1805). An image pickup angle 1903 indicates the value calculated here.

Next, the detection device 103 calculates a person's feature value with respect to the detection region 1901 (step 1806). A person's feature value 1904 indicates the value calculated here.

Next, the detection device 103 performs all collation with respect to the record data 320 in the specific person recording unit 200, using the person's feature value 1904 (step 1807). Collations 1910 to 1914 indicate collation with the respective records in the record data. Coincidences 1920 to 1924 indicate coincidence calculated in the respective collations. In the coincidence, as the value is smaller, the similarity is higher. As a result of the all collation, the smallest coincidence is the coincidence 1924. Accordingly, it is determined that the most similar person is the person E recorded in the record 304.

Next, the detection device 103 compares the coincidence 1924 of the person E as the most similar person obtained above with the previously-set first threshold value. In the present example, the first threshold value is 1.00. The coincidence 1924 is 0.90 which is equal to or lower than the threshold value. Accordingly, it is primarily determined that the appeared person is one of the specific persons, and is the person E (step 1808).

Next, the detection device 103 stores the detected person's ID "E" in a cell corresponding to the person's ID cell 511, the value of the coincidence 1924 in a cell corresponding to the coincidence cell 512, the angle 1903 in a cell corresponding to the angle cell 513, respectively, with respect to the record 500 of the stored data 520 in the determination result storing unit 206 (step 1809). The stored data 520 in FIG. 19B shows the status of the stored data at this time.

The series of processing at steps 1800 to 1809 is as described above.

Next, the detection device 103 calculates a proximity image pickup area of the image pickup area 1621. In this example, in the distance data 1700, the column 1701 holding the distance to the image pickup area 1621 is compared to the cells 1711 to 1713 in this order, to obtain stored values. The obtained stored values are compared with a predetermined threshold value, to obtain a proximity image pickup area existing in a distance equal to or lower than the threshold value, i.e., a short distance. There may be plural proximity image pickup areas. In the present example, assuming that the threshold value is 20, and as a result, the image pickup areas 1622, 1623 and 1624 are selected as proximity image pickup areas (step 1810). Then, (T+18), as a total of the stored value of the image pickup area 1624, as an image pickup area having the longest distance among the selected three image pickup areas, and the time (T), becomes predicted arrival time (TF) (step 1811). In the present example, the stored value of the image pickup area 1624 is simply added, however, a margin may be further added.

Next, the detection device 103 waits by the time (T+18) (step 1812).

Figure 20A:
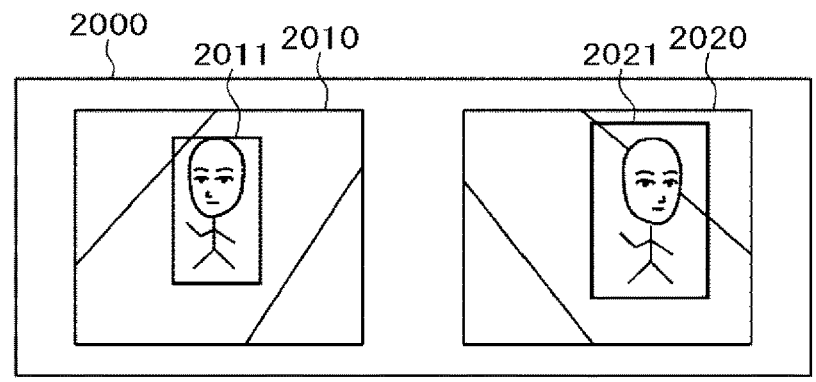
FIG. 20A is a diagram explaining the content of processing at time T+18.
Figure 20B:
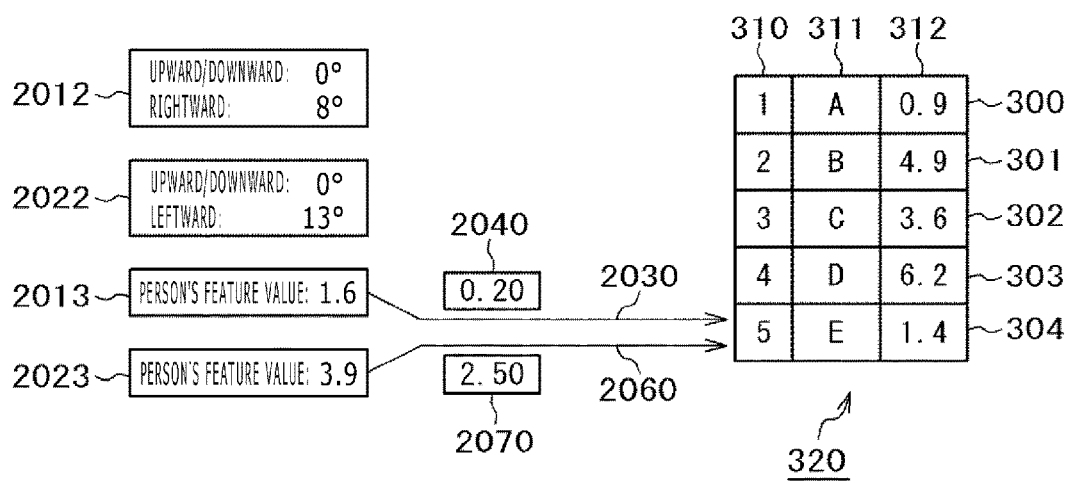
FIG. 20B is a diagram explaining the content of processing at time T+18.

The content of processing at the time (T+18) will be described using FIGS. 20A to 20C. The reference numerals the same as those in FIGS. 3 and 5 respectively denote the same elements.

The detection device 103 requests the retrieval device 1505 to perform similar image retrieval. The retrieval key at that time is the detection region 1901. As narrowing conditions regarding the image pickup time, from the time (T), and before the time (T+18) are given. Further, as narrowing conditions regarding the image pickup area, the image pickup areas 1622, 1623 and 1624 selected at step 1810 are given (step 1813).

A retrieval result 2000 indicates a retrieval result received at step 1814. In the present example, the retrieval result includes two images and coordinates of person's region in the respective images. An image 2010 is the first image in the retrieval result, and an image 2020 is the second image in the retrieval result. Further, a person's region 2011 is the person's region in the image 2010, and a person's region 2021 is the person's region in the image 2020.

Next, the detection device 103 calculates an image pickup angle with respect to the person's region 2011 (step 1817). An image pickup angle 2012 indicates the value calculated here.

Next, the detection device 103 calculates a person's feature value with respect to the person's region 2011 (step 1818). A person's feature value 2013 indicates the value calculated here.

Next, the detection device 103 performs collation with respect to the record data 320 in the specific person recording unit 200 using the person's feature value 2013 (step 1819). At this time, the collation is performed only on the person E's record as indicated in collation 2030. Coincidence 2040 is coincidence calculated in the collation 2030.

Next, the detection device 103 stores the detected person ID "E" in a cell corresponding to the person ID cell 511, the value of the coincidence 2040 in a cell corresponding to the coincidence cell 512, and the angle 2012 in a cell corresponding to the angle cell 513, respectively, with respect to the record 501 of the stored data 520 in the determination result storing unit 206 (step 1820). The stored data 520 in FIG. 20B shows the status of the stored data at this time.

Next, the detection device 103 calculates an image pickup angle with respect to the person's region 2021 (step 1817). An image pickup angle 2022 indicates the value calculated here.

Next, the detection device 103 calculates a person's feature value with respect to the person's region 2021 (step 1818). A person's feature value 2023 indicates the value calculated here.

Next, the detection device 103 performs collation with respect to the record data in the specific person recording unit 200 using the person's feature value 2023 (step 1819). At this time, the collation is performed only on the person E's record as indicated in collation 2060. Coincidence 2070 is coincidence calculated in the collation 2060.

Next, the detection device 103 stores the detected person's ID "E" in a cell corresponding to the person's ID cell 511, the value of the coincidence 2070 in a cell corresponding to the coincidence cell 512, and the angle 2022 in a cell corresponding to the angle cell 513, respectively, with respect to the record 502 of the stored data 520 in the determination result storing unit 206 (step 1820). The stored data 520 in FIG. 20C shows the status of the stored data at this time.

Figures 20C, 21:
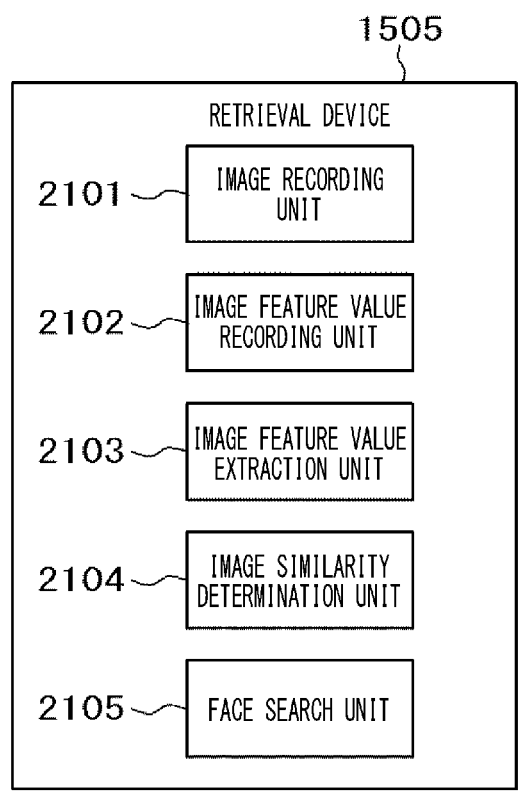
FIG. 20C is a diagram explaining the content of processing at time T+18.
FIG. 21 is a diagram showing a functional configuration of a retrieval device in FIG. 15.

Next, the detection device 103 reads the person E's angle previously recorded in the specific person recording unit 200, and searches for a result of the closest angle from the results stored in the stored data 5200 in FIG. 20C. In the present example, it is the record 501. Then, the coincidence stored in the record 501 is read. The read coincidence is compared with the previously-set second threshold value. In the present example, the second threshold value is 0.60. The read coincidence is 0.20 which is equal to or lower than the threshold value. Accordingly, it is comprehensively determined that the appeared person is one of the specific persons and is the person E (step 1822).

The series of processing to the detection is as described above.

As shown in FIG. 21, the retrieval device 1505 has parts, an image recording unit 2101, an image feature value recording unit 2102, an image feature value extraction unit 2103, an image similarity determination unit 2104, and a face search unit 2105.

The image recording unit 2101 is a part to record image data inputted from the image pickup devices 1501 to 1504 or the recording device 102 into an unshown recording medium such as an HDD. Upon recording of the image data, the image recording unit 2101 simultaneously records information to read the image data later, e.g. a frame number sequentially assigned on the frame basis from the start of recording as a unique number in the recording device. The frame number is a number which is sequentially assigned upon continuous storage of image by predetermined period as in the case of a moving image such as a video image. Further, the image recording unit 2101 also records information to discriminate when the image has been picked up, e.g., image time, simultaneously. At this time, the image time is e.g. device time outputted from a clock included in the recording device 102, or device time outputted from a clock respectively included in the image pickup devices 1501 to 1504. Further, the image recording unit 2101 also records information to discriminate the image pickup device that obtained the image, e.g., an IP address of the image pickup device, simultaneously.

The image feature value recording unit 2102 is a part to record an image feature value into the recording medium. The image feature value recording unit 2102 first obtains face image data by outputting the image data recorded with the image recording unit 2101 to the face search unit 2105. Then, the image feature value recording unit 2102 obtains an image feature value by outputting the face image data to the image feature value extraction unit 2103. Upon recording of the image feature amount, the image feature value recording unit 2102 simultaneously records a frame number corresponding to the image data inputted in the face search unit 2105. Hereinbelow, list data formed with the frame numbers and image feature values generated with this recording will be referred to as "image feature value list data".

The image feature value extraction unit 2103 is a part to calculate a feature value of the face image data inputted from the face search unit 2105 using an image recognition technique. As the image feature value, e.g., color distribution, edge pattern composition distribution of the image, or a combination of them is used.

The image similarity determination unit 2104 is a part to perform image retrieval and output a retrieval result. The image similarity determination unit 2104 calculates similarity from the image feature value of a retrieval image described below, and the image feature value of the face image in the image data recorded in the recording medium of the image recording unit 2101, and generates a retrieval result from the degree of the calculated similarity. The retrieval image is an image designated with the control instruction unit 209 in the detection device 103 as an model image inputted and referred to for similarity determination. The retrieval image is inputted as data included in a retrieval request signal. More particularly, it is designated with a frame number or the like of the image. Note that the image feature value of the retrieval image is obtained with the image similarity determination unit 2104 by outputting to the face search unit 2105. Further, the image feature value of the face image data recorded in the recording medium is obtained from the above-described image feature value list data recorded in the image feature value recording unit 2102. Further, the method for image similarity calculation is configured by referring to papers such as "Visualization Models for Large Image Sets" (HIROIKE, Atsushi et. al, Journal of Japan Photo Society 2003, vol. 66 no. 1, P 93-P 101).

When a retrieval request signal from the control instruction unit 209 of the detection device 103 is received, a controller of the retrieval device 1505 inputs a retrieval image designated with the control instruction unit 209 of the detection device 103 into the face search unit 2105, to search for a face. When a face is detected, the image feature value extraction unit 2103 extracts the image feature value of a face region included in the retrieval image. Then, the image similarity determination unit 2104 compares the above image feature value with the feature values in the image feature value list data previously extracted with registration processing. Image similarity is determined based on the image feature value. The record image in the recording device is searched for a person's image who a user desires to find by execution of retrieval processing, by using frame information or the like included in the image feature value list data. With this conventional registration processing, it is possible to realize similar face image retrieval with a monitor image as the object.

As it has been shown, in the present example, collation is performed in an image closest to the angle previously recorded in the specific person recording unit 200. In general, an image having a closer angle has a higher accuracy. Accordingly, in correspondence with the present example, it is possible to obtain higher detection accuracy in a specific person detection system. Further, in the present example, even when person's images from various angles are not previously registered, it is possible to obtain higher detection accuracy. Even when image pickup has not been performed on the same location with plural image pickup devices as in the case of the example 2, by utilizing a combination of image pickup devices in multiple locations, it is possible to obtain a high effect approximately equivalent to that obtained in the example 2.

In the description, for the sake of simplification of explanation, the number of image pickup devices is four. However, they may be implemented with plural devices other than four.

Further, similarly, the image pickup device, the recording device and the detection device are independent devices, however, they may be implemented as the same device.

Further, similarly, the detection device and the retrieval device are independent devices, however, they may be implemented as the same device.

Further, similarly, the detection device and the terminal device are independent devices, however, they may be implemented as the same device.

Further, similarly, the specific person detection system is shown as the object of the application of the invention, however, the invention may be implemented with a detection system for not only a specific person but a specific vehicle, a specific object, as the object of application of the invention.

As described above, the invention made by the present inventor has been particularly explained based on the embodiments and examples, however, the present invention is not limited to the above-described embodiments and examples. It goes without saying that various changes can be made.

REFERENCE SIGNS LIST 10, 20, 30: specific person detection system, 100: network, 101: image pickup device, 102: detection device, 103: recording device, 104: terminal device, 200: specific person recording unit, 201: image reception unit, 202: person detection unit, 203: person's angle calculation unit, 204: person's feature value calculation unit, 205: specific person determination unit, 206: determination result storing unit, 207: specific person comprehensive determination unit, 208: detection notification unit, 209: control instruction unit, 300 to 304: record, 310: record number cell, 310, 311: person's ID cell, 312: feature value cell, 313: angle cell, 314: person image cell, 320: record data, 400 to 434: step, 500 to 506: record, 510: record number cell, 511: person's ID cell, 512: coincidence cell, 513: angle cell, 514: person's region coordinates cell, 520: stored data, 600: horizontal axis, 610 to 630: timing, 700: image, 701: detection region, 702: region coordinates, 703: angle, 704: person's feature value, 710 to 714: collation, 720 to 724: coincidence, 800: image, 801: neighboring region, 802: detection region, 803: region coordinates, 804: angle, 805: person's feature value, 810: collation, 820: coincidence, 900: image, 901: neighboring region, 902: detection region, 903: region coordinates, 904: angle, 905: person's feature value, 910: collation, 920: coincidence, 1001 to 1003: image pickup device, 1110 to 1127: step, 1200: image, 1201: detection region, 1202: region coordinates, 1203: angle, 1204: person's feature value, 1210 to 1214: collation, 1220 to 1224: coincidence, 1300: image, 1301: detection region, 1302: region coordinates, 1303: angle, 1304: person's feature value, 1310: collation, 1320: coincidence, 1400: image, 1401: detection region, 1402: region coordinates, 1403: angle, 1404: person's feature value, 1410: collation, 1420: coincidence, 1501 to 1504: image pickup device, 1505: retrieval device, 1600: passage, 1601: route, 1611 to 1614: location, 1621 to 1624: image pickup area, 1700: distance data, 1701 to 1704: column, 1711 to 1713: cell, 1800 to 1824: step, 1900: image, 1901: detection region, 1902: region coordinates, 1903: angle, 1904: person's feature value, 1910 to 1914: collation, 1920 to 1924: coincidence, 2000: retrieval result, 2010: image, 2011: person's region, 2012: angle, 2013: person's feature value, 2020: image, 2021: person's region, 2022: angle, 2023: person's feature value, 2030: collation, 2040: coincidence, 2060: collation, and 2070: coincidence.

The invention claimed is:

1. A specific person detection system comprising:
a detection device including a specific person recording unit that holds a specific person,
an image pickup device, and
a terminal device,
wherein the detection device:
obtains a person most similar to a feature value extracted from image data obtained by the image pickup device from the specific person recording unit, calculates similarity between a feature value extracted from other image data and the person, and outputs a person having angle information most similar to the person, from persons having high similarity, as a collation result to the terminal device,
stores a person's image pickup angle of the person in a list of specific persons,
detects an arbitrary person with his/her image pickup angle, from an image obtained with the image pickup device,
obtains coincidence from feature all collation between the list of specific persons and the detected person, and performs specific person primary detection,
wherein the specific person detection system further comprises a recording device recording other image data,
wherein the detection device;
obtains another image other than the primary-detected image from the recording device,
detects a person the same as a primary-detected person with his/her image pickup angle, from the obtained another image, and performs collation, and
performs specific person comprehensive determination using the coincidence by a series of collation including the primary-detected result and the image pickup angle.

2. The specific person detection system according to claim 1,
wherein the another image is an image obtained at time within a specified range from the primary detection with the same image pickup device.

3. A specific person detection system comprising:
a detection device including a specific person recording unit that holds a specific person,
an image pickup device, and
a terminal device,
wherein the detection device:
obtains a person most similar to a feature value extracted from image data obtained by the image pickup device from the specific person recording unit, calculates similarity between a feature value extracted from other image data and the person, and outputs a person having angle information most similar to the person, from persons having high similarity, as a collation result to the terminal device,
stores an image pickup angle of the person in a list of specific persons,
detects an arbitrary person, with his/her image pickup angle, from the image obtained with the image pickup device,
obtains coincidence from feature all collation between the list of specific persons and the detected person, and performs primary detection of the specific person,
wherein the specific person detection system further comprises another image pickup device obtaining another image,
wherein the detection image;
obtains the another image other than the primary-detected image from the other image pickup device, detects a person the same as a primary-detected person, with his/her image pickup angle, from the obtained another image, and performs collation, and performs specific person comprehensive determination using the coincidence by a series of collation including the primary-detected result and the image pickup angle.

4. The specific person detection system according to claim 3, wherein the another image is an image obtained with the other image pickup device at the same time as the time when the image obtained with the image pickup device is obtained.

5. The specific person detection system according to claim 3, wherein the detection device further obtains an image pickup device near the image pickup device, and wherein the another image is an image in which the same person appears, obtained by similar image retrieval with the primary-detected image as a key, under conditions of time and location.

6. The specific person detection system according to claim 5, further comprising a retrieval device, wherein the retrieval device retrieves the another image.

7. A specific person detection method comprising:

recording a specific person in a specific person recording unit;

obtaining a person most similar to a feature value extracted from image data from the specific person recording unit;

calculating similarity between a feature value extracted from other image data and the person;

outputting a person having angle information most similar to the person, from persons having high similarity, as a collation result;

storing a person's image pickup angle of the person in a list of specific persons;

detecting an arbitrary person with his/her image pickup angle, from an image obtained with an image pickup device;

obtaining coincidence from feature all collation between the list of specific persons and the detected person, and performs specific person primary detection, recording other image data in a recording device, obtaining another image other than the primary-detected image from the recording device;

detecting a person the same as a primary-detected person with his/her image pickup angle, from the obtained another image, and performs collation; and performing specific person comprehensive determination using the coincidence by a series of collation including the primary-detected result and the image pickup angle.

* * * * *